US012641184B2

(12) United States Patent
Suzuki

(10) Patent No.:  US 12,641,184 B2
(45) Date of Patent:      May 26, 2026

(54) INFORMATION PROCESSING APPARATUS CAPABLE OF USING INFORMATION ON CUT LINE WHICH IS PRINTING ITEM THAT CANNOT BE SET BY PRINTER DRIVER AND IS PRINTED ON RECORDING MEDIUM, PRINTING SETTING APPLICATION, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Takanobu Suzuki, Kanagawa (JP)

(73) Assignee: CANON KABUSHIKI KAISHA, Tokyo (JP)

( * ) Notice:  Subject to any disclaimer, the term of this patent is extended or adjusted under 35 U.S.C. 154(b) by 99 days.

(21) Appl. No.: 18/479,319

(22) Filed: Oct. 2, 2023

(65) Prior Publication Data

US 2024/0121346 A1      Apr. 11, 2024

(30) Foreign Application Priority Data

Oct. 7, 2022     (JP) ................................ 2022-162457

(51) Int. Cl.
*H04N 1/00* (2006.01)
*G06F 3/12* (2006.01)
(52) U.S. Cl.
CPC ....... *H04N 1/00676* (2013.01); *G06F 3/1205* (2013.01); *G06F 3/1258* (2013.01)

(58) Field of Classification Search
None
See application file for complete search history.

(56) References Cited

U.S. PATENT DOCUMENTS

| | | | |
|---|---|---|---|
| 2012/0019487 A1* | 1/2012 | Kazamaki | ............. G06F 40/242 |
| | | | 345/179 |
| 2013/0045851 A1* | 2/2013 | Hori | ....................... G06F 3/1204 |
| | | | 493/405 |
| 2017/0166273 A1* | 6/2017 | Lee | ....................... B26D 7/1845 |
| 2019/0004745 A1* | 1/2019 | Itai | ......................... G06F 3/1205 |

(Continued)

FOREIGN PATENT DOCUMENTS

| | | | |
|---|---|---|---|
| JP | 2021140219 | * | 9/2021 |
| JP | 2021140219 A | | 9/2021 |

*Primary Examiner* — Helen Zong

(74) *Attorney, Agent, or Firm* — ROSSI, KIMMS & McDOWELL LLP

(57) ABSTRACT

An information processing apparatus capable of using information on a cut line which is a printing item that cannot be set by a printer driver and is printed on a recording medium is provided. The information processing apparatus including a printer driver includes a controller configured or programmed to function as an acquisition unit that acquires capability information on capability to perform printing on a sheet-like recording medium from a server providing a cloud print service or a printer, and a display control unit that displays a screen. The capability information includes first information on printing items capable of being set by the printer driver, and second information on a cut line, which is a printing item not capable of being set by the printer driver and is printed on the recording medium. The display control unit enables the second information to be displayed on the screen.

19 Claims, 23 Drawing Sheets

(56)　　　　　　References Cited

U.S. PATENT DOCUMENTS

2021/0216253 A1\*　7/2021　Fukuoka ............... G06F 3/1256
2023/0034261 A1\*　2/2023　Ichikawa .............. G06F 3/1205
2023/0205472 A1\*　6/2023　Hayashi ............... G06F 3/1208
　　　　　　　　　　　　　　　　　　　358/1.15
2023/0404690 A1\*　12/2023　Ohashi ................... A61B 17/29

\* cited by examiner

FIG. 5

| ITEM NAME 501 | ATTRIBUTE VALUE 502 |
|---|---|
| PAPER SIZE | A6 / A5 / A4 / B5 / LETTER / LEGAL / EXECUTIVE / POSTCARD / #10 ENVELOPE VERTICAL / DL ENVELOPE VERTICAL / ENVELOPE (JAPANESE WESTERN-STYLE ENVELOPE NO. 4) VERTICAL / ENVELOPE (LONG TYPE NO. 3) VERTICAL / ENVELOPE (LONG TYPE NO. 4) VERTICAL / ENVELOPE C5 VERTICAL / ENVELOPE MONARCH VERTICAL / L / 4 × 6 (KG SIZE) /5 × 7 / 6P (8 × 10) / SQUARE (127mm) / BUSINESS CARD (CARD) / ENVELOPE (JAPANESE WESTERN-STYLE ENVELOPE NO. 6) VERTICAL / SQUARE (89mm) / SQUARE (4 × 4) / POSTER 20″ × 30″ / A0 / A1 /A2+ / B0 / B1 / B2 / 34″ × 44″ (ANSIE) |
| TYPE OF PAPER | ENVELOPE / LABEL / PLAIN PAPER / PHOTO PAPER / PHOTO PAPER LUSTER STANDARD / PHOTO PAPER SILKY TONE / INKJET POSTCARD (COMMUNICATION SURFACE) / INKJET POSTCARD (ADDRESS SURFACE) / POSTCARD FOR INKJET PHOTO (COMMUNICATION SURFACE) / POSTCARD FOR INKJET PHOTO (ADDRESS SURFACE) / WATERPROOF POSTER SYNTHETIC PAPER (MATTE) / DISASTER PREVENTION CLOTH HG / CANVAS (MATTE) / COATED PAPER |
| NUMBER OF COPIES | Max=99 |
| DIRECTION OF PAPER | VERTICAL/HORIZONTAL |
| PRINTING QUALITY | STANDARD/DRAFT |
| PRINTING BASED ON NUMBER OF COPIES | ON／OFF |
| STAPLE | NO / AUTOMATIC / UPPER LEFT / LOWER LEFT / UPPER RIGHT / LOWER RIGHT / LEFT END (TWO-POINT BINDING) / UPPER END (TWO-POINT BINDING) / RIGHT END (TWO-POINT BINDING) / LOWER END (TWO-POINT BINDING) / SADDLE STITCHING / STAPLELESS BINDING |
| PUNCH | NO / PUNCH HOLE (AUTOMATIC) / PUNCH HOLE (TWO HOLES ON LEFT SIDE) / PUNCH HOLE (THREE HOLES ON LEFT SIDE) / PUNCH HOLE (FOUR HOLES ON LEFT SIDE) / PUNCH HOLE (MULTI-HOLE ON LEFT SIDE) / PUNCH HOLE (TWO HOLES ON RIGHT SIDE) / PUNCH HOLE (THREE HOLES ON RIGHT SIDE) / PUNCH HOLE (FOUR HOLES ON RIGHT SIDE) / PUNCH HOLE (MULTI-HOLE ON RIGHT SIDE) / PUNCH HOLE (TWO HOLES ON UPPER SIDE) / PUNCH HOLE (THREE HOLES ON UPPER SIDE) / PUNCH HOLE (FOUR HOLES ON UPPER SIDE) / PUNCH HOLE (MULTI-HOLE ON UPPER SIDE) / PUNCH HOLE (TWO HOLES ON LOWER SIDE) / PUNCH HOLE (THREE HOLES ON LOWER SIDE) / PUNCH HOLE (FOUR HOLES ON LOWER SIDE) / PUNCH HOLE (MULTI-HOLE ON LOWER SIDE) |
| FOLDING SETTING | NO / FOLDED IN HALF / C-FOLDING / FOLDED IN FOUR / FOLDED IN THREE OUTSIDE / Z-FOLDING / SADDLE FOLDING (OUTPUT FROM SADDLE FINISHER) |
| COLOR MODE | COLOR/MONOCHROME |
| PAGE AGGREGATION | OFF／2in1／4in1／6in1／9in1／16in1 |
| PLACEMENT ORDER | LEFT TO RIGHT/RIGHT TO LEFT |
| MAGNIFICATION | NO / FIT TO PAGE WIDTH / FIT TO SCREEN SIZE |
| DUPLEX PRINTING | SINGLE-SIDED/DOUBLE-SIDED |
| BINDING DIRECTION | LONG EDGE BINDING/SHORT EDGE BINDING |
| ROTATION OF 180 DEGREES | NO/LEFT ROTATION/RIGHT ROTATION |
| SAVE JOB IN PRINTER | ON／OFF |
| JOB NAME ABBREVIATION | ON／OFF |
| LANGUAGE SWITCHING | Japanese/English/French/German/Italian/Spanish/Portuguese/Dutch/ Danish/ Norwegian/Swedish/Finnish/Polish/Czech/Russian/Turkish/Chinese(Simplified)/ Chinese(Traditional)/Korean/Thai/Indonesian |
| CUT LINE PRINTING | ON／OFF |

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%                    701
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_devoce001"
```

702

100

ROTATION OF 180 DEGREES

NO ▽

SAVE JOB IN PRINTER

OFF ▽

JOB NAME ABBREVIATION

ON ▽                    1006

DELETE FOLLOWING CHARACTER
STRING FROM BEGINNING
OF JOB NAME

SAMPLE DOCUMENT

1003

OK          CANCEL

```xml
<?xml version="1.0" encoding="UTF-8"?>
<psf:PrintTicket xmlns:psf="http://schemas.microsoft.com/windows/2003/08/printing/printschemaframework"
xmlns:xsi="http://www.w3.org/2001/XMLSchema-instance" xmlns:xsd="http://www.w3.org/2001/XMLSchema"
version="1" xmlns:ns0000="http://www.canon.com/ns/printschema/oip/v200"
xmlns:ns0001="http://schemas.microsoft.com/windows/2018/04/printing/printschemakeywords/ipp"
xmlns:psk="http://schemas.microsoft.com/windows/2003/08/printing/printschemakeywords">
<psf:Feature name="psk:PageMediaSize">
  <psf:Option name="psk:ISOA4">
  <psf:ScoredProperty name="psk:MediaSizeWidth">
    <psf:Value xsi:type="xsd:integer">210000</psf:Value>
  </psf:ScoredProperty>
  <psf:ScoredProperty name="psk:MediaSizeHeight">
    <psf:Value xsi:type="xsd:integer">297000</psf:Value>
  </psf:ScoredProperty>
  </psf:Option>
</psf:Feature>
......
<psf:Feature name="ns0000:JobAutoCut">
  <psf:Option name="nsAutoCut">
</psf:Feature>

<psf:Feature name="ns0000:JobCutLinePrint">
  <psf:Option name="ns0000:None" />
</psf:Feature>
......
</psf:PrintTicket>
```

FIG. 15B

```xml
<?xml version="1.0" encoding="UTF-8"?>
<psf:PrintTicket xmlns:psf="http://schemas.microsoft.com/windows/2003/08/printing/printschemaframework"
xmlns:xsi="http://www.w3.org/2001/XMLSchema-instance" xmlns:xsd="http://www.w3.org/2001/XMLSchema"
version="1" xmlns:ns0000="http://www.canon.com/ns/printschema/oip/v200"
xmlns:ns0001="http://schemas.microsoft.com/windows/2018/04/printing/printschemakeywords/1pp"
xmlns:psk="http://schemas.microsoft.com/windows/2003/08/printing/printschemakeywords">
  <psf:Feature name="psk:PageMediaSize">
    <psf:Option name="psk:ISOA4">
      <psf:ScoredProperty name="psk:MediaSizeWidth">
        <psf:Value xsi:type="xsd:integer">210000</psf:Value>
      </psf:ScoredProperty>
      <psf:ScoredProperty name="psk:MediaSizeHeight">
        <psf:Value xsi:type="xsd:integer">297000</psf:Value>
      </psf:ScoredProperty>
    </psf:Option>
  </psf:Feature>
  ......
  <psf:Feature name="ns0000:JobAutoCut">
    <psf:Option name="ns0000:None" />
  </psf:Feature>
  <psf:Feature name="ns0000:JobCutLinePrint">
    <psf:Option name="ns0000:CotLinePrint" />
  </psf:Feature>
  <psf:Feature name="ns0000:JobCutLinePrintType">
    <psf:Option name="ns0000:Dotted" />
  </psf:Feature>
  <psf:ParameterInit name="ns0000:JobCutLinePrintColor">
    <psf:Value xsi:type="xsd:string">#7F808080</psf:Value>
  </psf:ParameterInit>
</psf:PrintTicket>
```

1

INFORMATION PROCESSING APPARATUS CAPABLE OF USING INFORMATION ON CUT LINE WHICH IS PRINTING ITEM THAT CANNOT BE SET BY PRINTER DRIVER AND IS PRINTED ON RECORDING MEDIUM, PRINTING SETTING APPLICATION, CONTROL METHOD FOR INFORMATION PROCESSING APPARATUS, AND STORAGE MEDIUM

BACKGROUND OF THE INVENTION

Field of the Invention

The present invention relates to an information processing apparatus, a printing setting application, a control method for the information processing apparatus, and a storage medium.

Description of the Related Art

In recent years, a general-purpose printer driver that operates (runs) based on an industry standard protocol such as an Internet printing protocol (IPP) has been considered. Examples of the general-purpose printer driver include a local printer driver that directly transmits printing data to a printer (an image forming apparatus) and a cloud printer driver that transmits the printing data via a cloud print service. Furthermore, the general-purpose printer driver is able to communicate with printers provided by a plurality of printer vendors. As a result, it is possible to transmit the printing data to the printer or the cloud print service without installing a printer driver unique to the printer vendor. Therefore, the general-purpose printer driver is able to deal with printing jobs executed by the printers of the various printer vendors, but items and functions that can be set as printing settings may be limited accordingly. Therefore, an apparatus, which extends a print queue associated with a printer driver by using identification information of a printer associated with the printer driver, has been known (for example, see Japanese Laid-Open Patent Publication (kokai) No. 2021-140219). As a result, it becomes possible to designate an automatic cutting function of automatically operating a cutter after printing with respect to the printing job unique to the vendor.

When a printing job is transmitted to a printer capable of performing printing on a long paper sheet such as a roll paper sheet, it is possible to set whether or not to print a cut line on the long paper sheet by using a print driver developed by the manufacturer of the printer. Furthermore, in the case that the printing of the cut line is designated, the long paper sheet can be cut along the cut line after the printing of the cut line.

In addition, with the general-purpose printer driver such as a standard driver that is preinstalled in an operating system (OS), it is possible to acquire printer capability information predetermined by the OS regarding a printer selected by a user for use in printing. However, even in the case that the printer has capabilities other than the setting items predetermined by the OS (for example, a cut line printing function), the general-purpose printer driver cannot utilize these capabilities.

SUMMARY OF THE INVENTION

The present invention provides an information processing apparatus capable of using information on a cut line which is a printing item that cannot be set by a printer driver and is printed on a recording medium. Furthermore, the present invention provides a printing setting application capable of using the information on the cut line which is the printing item that cannot be set by the printer driver and is printed on the recording medium, a control method for the information processing apparatus, and a storage medium.

Accordingly, the present invention provides an information processing apparatus including a printer driver, the information processing apparatus comprising a controller configured or programmed to function as an acquisition unit that acquires capability information on capability to perform printing on a sheet-like recording medium from a server providing a cloud print service or a printer, and a display control unit that displays a screen. The capability information includes first information on printing items capable of being set by the printer driver, and second information on a cut line, which is a printing item not capable of being set by the printer driver and is printed on the recording medium. The display control unit enables the second information to be displayed on the screen.

According to the present invention, it is possible to use the information on the cut line which is the printing item that cannot be set by the printer driver and is printed on the recording medium.

Further features of the present invention will become apparent from the following description of exemplary embodiments with reference to the attached drawings.

BRIEF DESCRIPTION OF THE DRAWINGS

FIG. 5 is a table that shows an example of capability information.

FIG. 6 is a diagram that shows an example in which a cut line printed by a cloud print compatible printer is manually cut.

FIG. 7 is a diagram that shows an example of an extended setup information file.

FIG. 15A is a diagram that shows an example of a print ticket in a case that an automatic cutting function is turned on (ON).

FIG. 15B is a diagram that shows an example of the print ticket in a case that the automatic cutting function is turned off (OFF).

DESCRIPTION OF THE EMBODIMENTS

The present invention will now be described in detail below with reference to the accompanying drawings showing embodiments thereof.

Hereinafter, embodiments of the present invention will be described in detail with reference to the drawings. However, the configurations described in the following embodiments are merely examples, and the scope of the present invention is not limited by the configurations described in the following embodiments. For example, each unit constituting the present invention can be replaced with a unit having any configuration capable of exhibiting a similar function. In addition, any component may be added.

Figure 1:
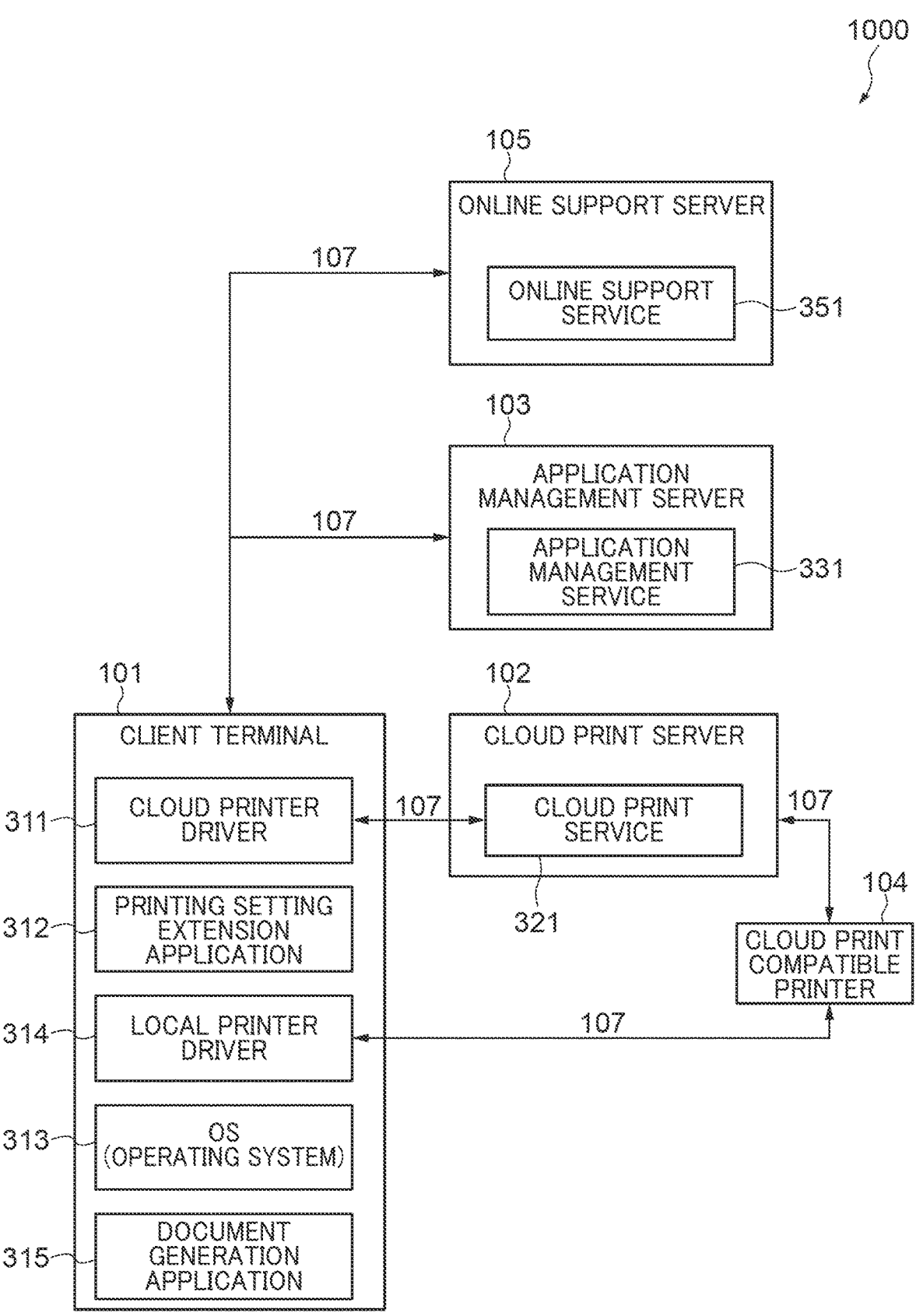
FIG. 1 is a block diagram that shows an example of a schematic configuration of a printing system.

FIG. 1 is a block diagram that shows an example of a schematic configuration of a printing system. As shown in FIG. 1, a printing system 1000 includes a client terminal 101, a cloud print server 102, an application management server 103, a cloud print compatible printer 104, and an online support server 105. In addition, these apparatuses are communicably connected to each other via a network 107. The client terminal 101 is, for example, an information processing apparatus such as a personal computer (PC), a tablet terminal, or a smartphone, and is a terminal operated by a user. The client terminal 101 has an operating system (OS) 313. On the OS 313, a cloud printer driver 311, a printing setting extension application (a printing setting application) 312, and a local printer driver 314 can be executed. Each printer driver of the cloud printer driver 311 and the local printer driver 314 is, for example, a general-purpose printer driver (an OS standard printer driver) that is preinstalled or installed after purchase of the client terminal 101. By this installation, the client terminal 101 includes the cloud printer driver 311 and the local printer driver 314. Hereinafter, the cloud printer driver 311 and the local printer driver 314 may be collectively referred to as "the general-purpose printer driver (the OS standard printer driver)". The printing setting extension application 312 is installed from an application management service 331 of the application management server 103 to the client terminal 101. The printing setting extension application 312 is application software that extends the functions of the cloud printer driver 311 and the local printer driver 314. Therefore, the printing setting extension application 312 is a program for causing a central processing unit (CPU) 212 to execute each part and each unit (a control method for the information processing apparatus) of the client terminal 101. That is, the printing setting extension application 312 is a program for causing the CPU 212 (the client terminal 101) to execute each process of an acquisition step and a display control step that will be described below.

The cloud print compatible printer 104 is an image forming apparatus that performs printing on a sheet-like recording medium such as a paper sheet. In the printing system 1000, the cloud print compatible printer 104 converts printing data received via the network 107 into image data and prints the image data on the recording medium. The cloud print compatible printer 104 is able to receive the printing data from the client terminal 101 via the cloud print server 102, or is able to directly receive the printing data from the client terminal 101 without passing through the cloud print server 102. As a result, the cloud print compatible printer 104 is able to receive the printing data generated by the cloud printer driver 311 of the client terminal 101 via the cloud print server 102. Further, the cloud print compatible printer 104 is able to receive the printing data generated by the local printer driver 314 of the client terminal 101 without passing through the cloud print server 102.

The cloud print server 102 is a server that provides a cloud print service 321. Specifically, the cloud print server 102 accepts (receives) a printing instruction and printing data from an external device such as the client terminal 101. Furthermore, the cloud print server 102 transmits the received printing data to the predetermined cloud print compatible printer 104. The application management server 103 is a server that provides the application management service 331, and stores (holds) and manages various kinds of applications. The application management server 103 receives identification information of an application and a download request from the client terminal 101. Then, the application management server 103 transmits the application specified based on the received identification information to the client terminal 101. The online support server 105 is a server that provides an online support service 351. The online support service 351 is able to provide the client terminal 101 with an extended setup information file 700 (see FIG. 7) in which information for extending the function of the client terminal 101 is described. As the network 107, for example, a local area network (LAN) or a wide area network (WAN) may be used although it depends on the use environment of the printing system 1000.

It should be noted that the number of client terminals 101 and the number of cloud print compatible printers 104 are each one in the present embodiment, but are not limited thereto, and may be plural. In addition, each of the cloud print server 102, the application management server 103, and the online support server 105 may be configured by one server or may be configured by a plurality of servers. In the case that each of the cloud print server 102, the application management server 103, and the online support server 105 is configured by the plurality of servers, the load at the time of processing can be distributed. Further, the cloud print server 102, the application management server 103, and the online support server 105 may be built within one server.

Figure 2A:
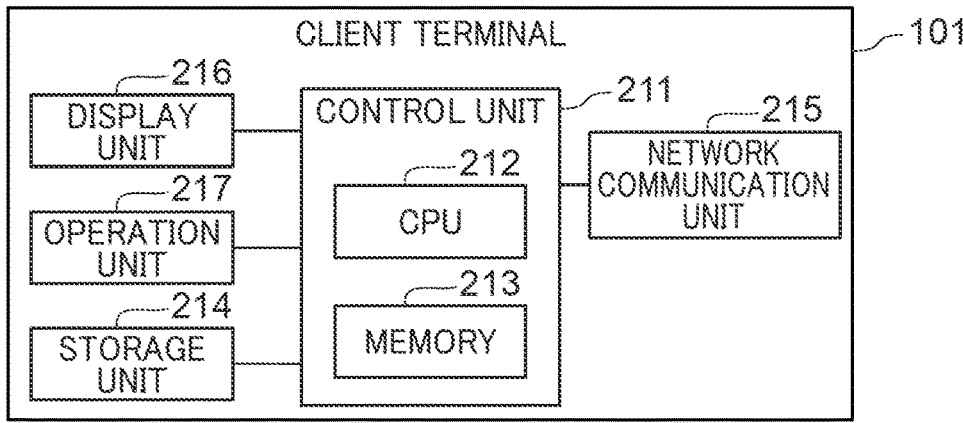
FIGS. 2A, 2B, 2C, 2D and 2E are block diagrams that show examples of hardware configurations of respective apparatuses included in the printing system shown in FIG. 1.

FIGS. 2A, 2B, 2C, 2D, and 2E are block diagrams that show examples of hardware configurations of respective apparatuses included in the printing system shown in FIG. 1. FIG. 2A is a block diagram that shows an example of the hardware configuration of the client terminal. As shown in FIG. 2A, the client terminal 101 includes a control unit 211, a storage unit 214, a network communication unit 215, a display unit 216, and an operation unit 217. The control unit 211 includes the CPU 212 and a memory 213, and controls the overall operation of the client terminal 101. The CPU 212 is a computer that loads a program stored in the storage unit 214 to the memory 213 and executes the program. The memory 213 is a main storage memory of the CPU 212 and is used as a working area and a temporary storage area for loading various kinds of programs. The storage unit 214 is a nonvolatile storage device such as a hard disk or a solid state drive (SSD), and is able to store and rewrite digital data. The network communication unit 215 is a device that communicates with an external device via the network 107. As a result, the network communication unit 215 is able to perform inputting and outputting of the digital data with respect to the client terminal 101 and the like via the network 107. The display unit 216 includes, for example, a liquid crystal display or the like, and is a device that displays visual information on a screen for the user. The screen display by the display unit 216 is controlled by the control unit 211 (a display control unit). The operation unit 217 includes, for example, a keyboard, a mouse, or the like, and is a device that accepts (receives) an input from the user. It should be noted that the client terminal 101 may include a device such as a touch panel having functions of both the display unit 216 and the operation unit 217.

Figure 2B:
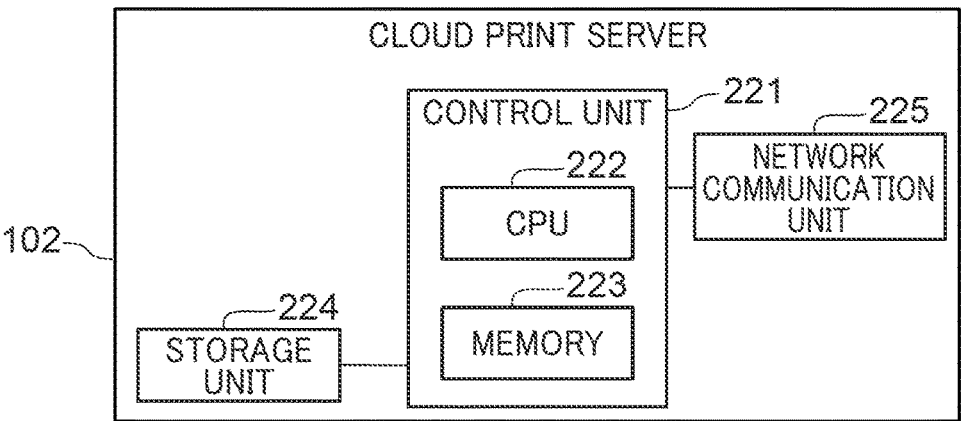

FIG. 2B is a block diagram that shows an example of the hardware configuration of the cloud print server. As shown in FIG. 2B, the cloud print server 102 includes a control unit 221 including a CPU 222 and a memory 223, a storage unit 224, and a network communication unit 225. Since the control unit 221, the storage unit 224, and the network communication unit 225 are equivalent to those of the client terminal 101, the description thereof will be omitted.

Figure 2C:
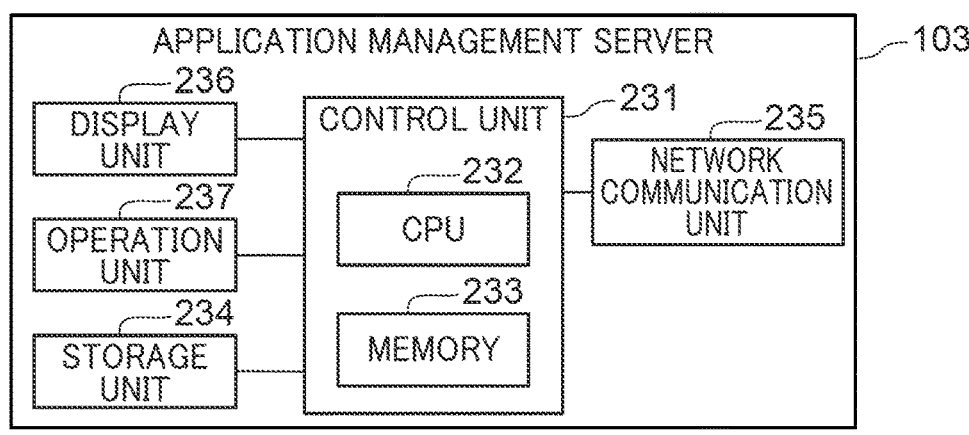

FIG. 2C is a block diagram that shows an example of the hardware configuration of the application management server. As shown in FIG. 2C, the application management server 103 includes a control unit 231 including a CPU 232 and a memory 233, a storage unit 234, a network communication unit 235, a display unit 236, and an operation unit 237. Since the control unit 231, the storage unit 234, the network communication unit 235, the display unit 236, and the operation unit 237 are equivalent to those of the client terminal 101, the description thereof will be omitted.

Figure 2D:
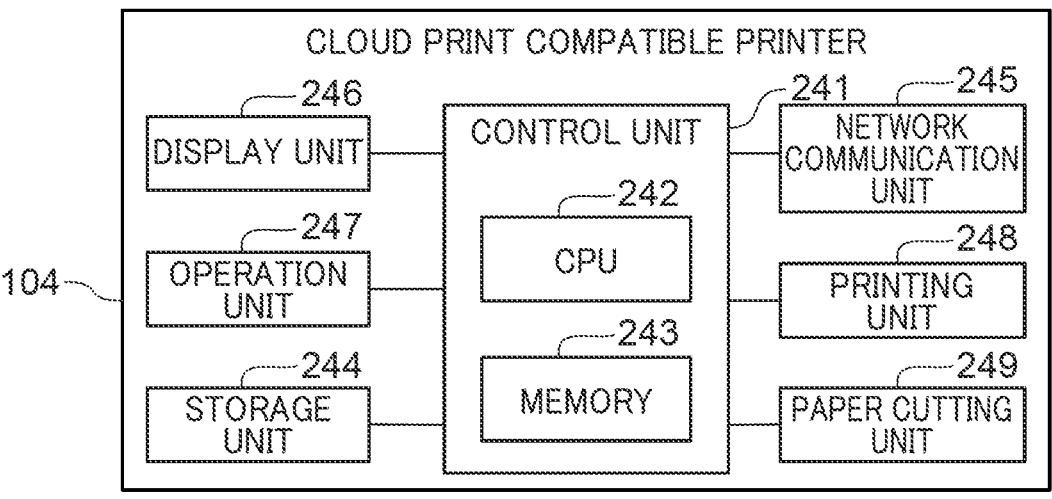

FIG. 2D is a block diagram that show an example of the hardware configuration of the cloud print compatible printer. As shown in FIG. 2D, the cloud print compatible printer 104 includes a control unit 241 including a CPU 242 and a memory 243, a storage unit 244, a network communication unit 245, a display unit 246, an operation unit 247, a printing unit 248, and a paper cutting unit (a cutting unit) 249. Since the control unit 241 and the storage unit 244 are equivalent to those of the client terminal 101, the description thereof will be omitted. The network communication unit 245 is a device that communicates with an external device via the network 107. The network communication unit 245 mainly has a role of receiving the printing data and transmitting information on the state of the cloud print compatible printer 104 such as an error to the external device such as the cloud print server 102. The display unit 246 includes, for example, a touch panel, a light emitting diode (LED), or the like, and is a device that displays visual information with respect to a user in real time. The operation unit 247 includes, for example, a touch panel and a hard key such as a numeric keypad, and is a device for accepting (receiving) an input from the user. The printing unit 248 is a device that performs a printing processing by performing a series of operations of paper feeding, printing, and paper discharging with respect to a paper sheet (a recording medium) prepared in a cassette or a tray. A method of the printing is not particularly limited, and for example, an electrophotographic method, an inkjet method, or the like can be used. Furthermore, the printing unit 248 also includes, for example, a double-sided unit used at the time of the paper discharging, and a finishing device used in stapling, punching processing, etc. The paper cutting unit 249 is a device that cuts the paper sheet printed by the printing unit 248 at a position (location) where a cut line 601 to be described below should to be printed, that is, is a device that performs a cut processing. In particular, the paper cutting unit 249 is used in the case that the paper sheet to be printed is a roll paper sheet. Accordingly, the roll paper sheet can be cut into a desired size. It should be noted that the cloud print compatible printer 104 is a single function printer that performs only a printing function in the present embodiment, but is not limited thereto, and may be, for example, a multi-function printer (a multi-function peripheral) that also has a scanner function and a FAX function.

Figure 2E:
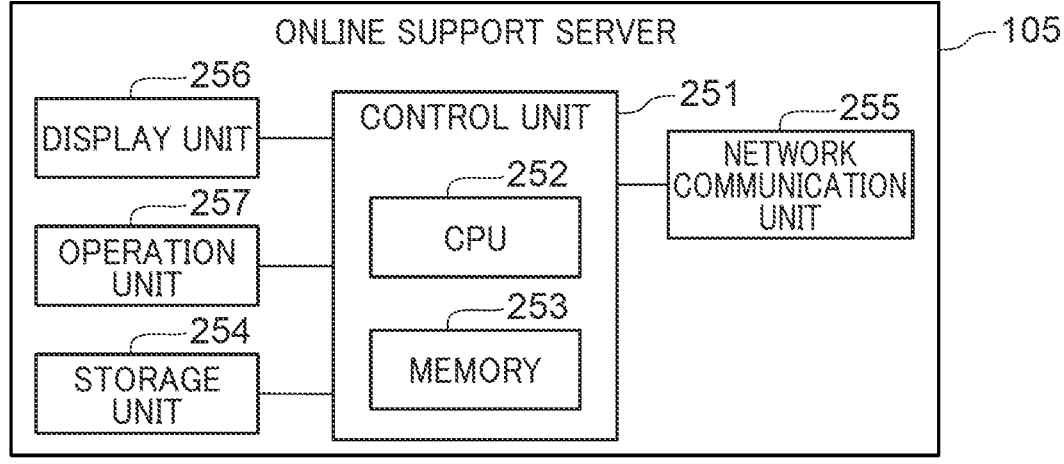

FIG. 2E is a block diagram that shows an example of the hardware configuration of the online support server. As shown in FIG. 2E, the online support server 105 includes a control unit 251, a storage unit 254, a network communication unit 255, a display unit 256, and an operation unit 257. The control unit 251 includes a CPU 252 and a memory 253, and controls the overall operation of the online support server 105. The CPU 252 is a computer that loads a program to the memory 253 and executes the program. The storage unit 254 is, for example, a nonvolatile storage device such as a hard disk or an SSD. The storage unit 254 stores the extended setup information file 700 provided to the client terminal 101. The extended setup information file 700 is a file in which information for extending the function of the client terminal 101 is described. The network communication unit 255 is an interface configured to allow the online support server 105 to communicate with the client terminal 101. The online support server 105 receives an acquisition request of a file stored in the storage unit 254 via the network communication unit 255. Furthermore, the online support server 105 transmits the file corresponding to the received acquisition request to the client terminal 101. Since the display unit 256 and the operation unit 257 are equivalent to those of the client terminal 101, the description thereof will be omitted.

Figure 3:
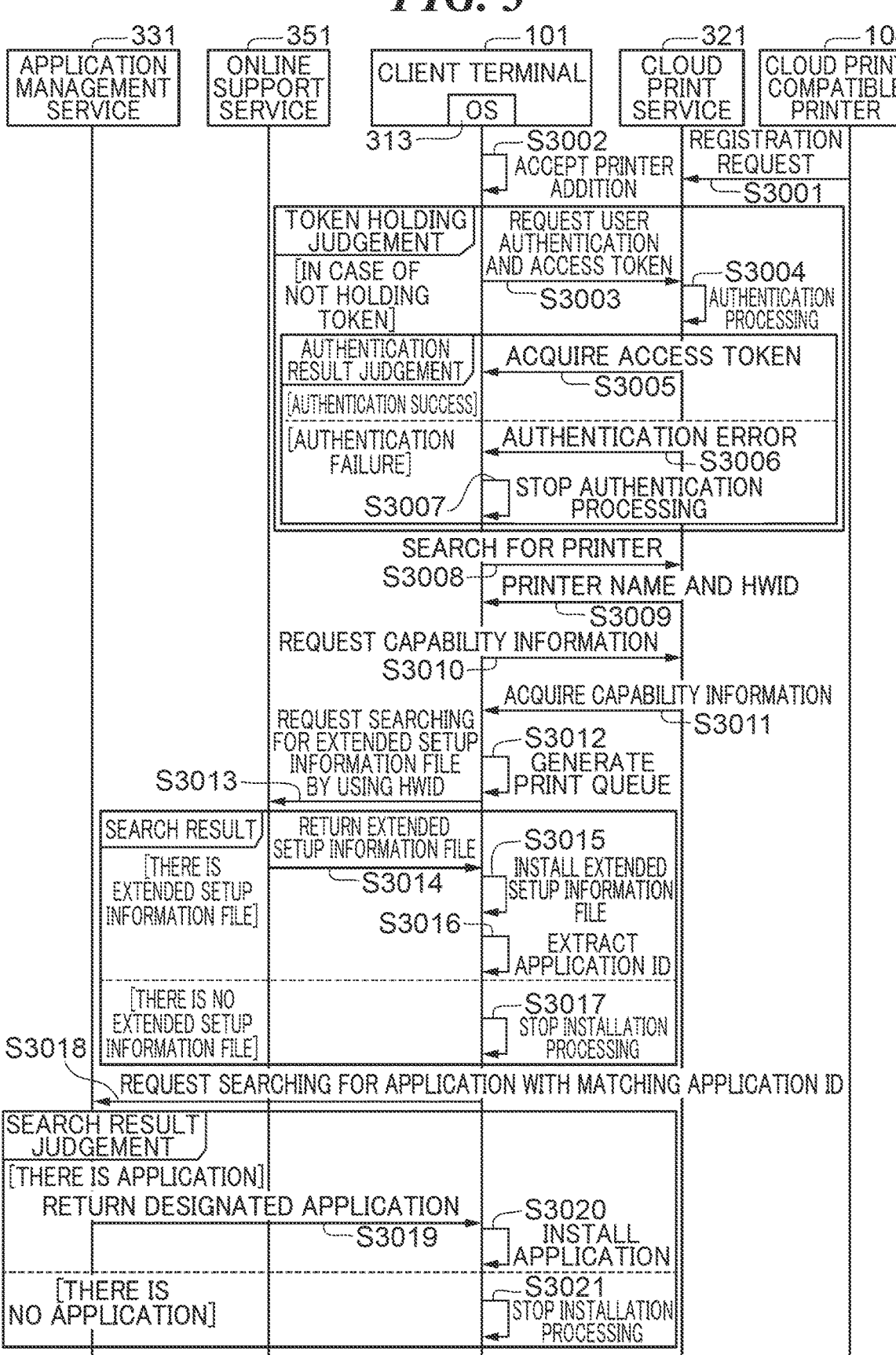
FIG. 3 is a sequence that shows an example of a processing that installs a printing setting extension application.

A sequence executed among the application management service 331, the online support service 351, the OS 313 of the client terminal 101, the cloud print service 321, and the cloud print compatible printer 104 will be described with reference to FIG. 3. FIG. 3 is a sequence that shows an example of a processing that installs the printing setting extension application. First, the cloud print compatible printer 104 accepts (receives) a printer registration operation for registering the cloud print compatible printer 104 in the cloud print service 321 from the user. As shown in FIG. 3, in a step S3001, the cloud print compatible printer 104 transmits a printer registration request to the cloud print service 321 together with device identification information. The device identification information is information for identifying the cloud print compatible printer 104, and the information is, for example, a hardware ID (HWID) allocated for each model of the printer, but is not limited thereto.

Upon receiving the printer registration request in the step S3001, the cloud print service 321 transmits a uniform resource locator (URL) of the cloud print service 321 for printer registration to the cloud print compatible printer 104. As a result, for example, the user is able to access the URL by operating the cloud print compatible printer 104 (or the information processing apparatus such as the client terminal 101). Then, the display unit 246 of the cloud print compatible printer 104 displays an input screen for inputting a user ID and a password for using the cloud print service 321. The user inputs the user ID and the password via the operation unit 247 of the cloud print compatible printer 104 to log in to the cloud print service 321. In the case that the login is successful, the cloud print service 321 transmits an acquisition request for information necessary for the printer registration to the cloud print compatible printer 104. The cloud print compatible printer 104 transmits printer information to the cloud print service 321 in response to the acquisition request.

The cloud print service 321 that has accepted (received) the printer registration request in the step S3001 registers the information on the cloud print compatible printer 104 and generates a print queue for the cloud print compatible printer 104. At this time, the cloud print service 321 acquires capability information of the cloud print compatible printer 104. Then, the cloud print service 321 associates the capability information with the print queue. "The capability information" is information on the capability of the cloud print compatible printer 104 to perform printing on the recording medium, that is, information necessary for the user to perform setting as a printing setting at the time of printing. The capability information is not particularly limited, and examples thereof include double-sided capability information, color capability information, stapling (stapler) capability information, and cut line printing information. These pieces of information are divided into two types. The first type (the first type of information) is first information related to printing items that can be set by the general-purpose printer driver (the OS standard printer driver), which is the cloud printer driver 311 and the local printer driver 314. The second type (the second type of information) is second information related to the cut line 601 that is a printing item that cannot be set by the general-purpose printer driver and is to be printed on the recording medium. For example, the double-sided capability information, the color capability information, and the stapling capability information are classified as the first information, and the cut line printing information is classified as the second information.

FIG. 5 is a table that shows an example of the capability information. The storage unit 244 of the cloud print compatible printer 104 stores, for example, the capability information shown in FIG. 5. The capability information has a hierarchical structure including an item name (an item) 501 as the first information and an attribute value 502 as a plurality of pieces of the second information belonging to the first information. It should be noted that, although there is a plurality of item names (items) 501 in the present embodiment, there may be at least one item name (item). The item name 501 corresponds to a setting item of the printing setting. The attribute value 502 corresponds to setting value(s), option(s), or/and value ranges that can be set in each setting item. The item name 501 includes an item name defined as an industry standard specification by the Internet printing protocol (IPP) as a communication protocol and an item name uniquely defined by a printer vendor. Similarly, the attribute value 502 includes an attribute value defined by the IPP and an attribute value uniquely defined by the printer vendor.

Figure 6:
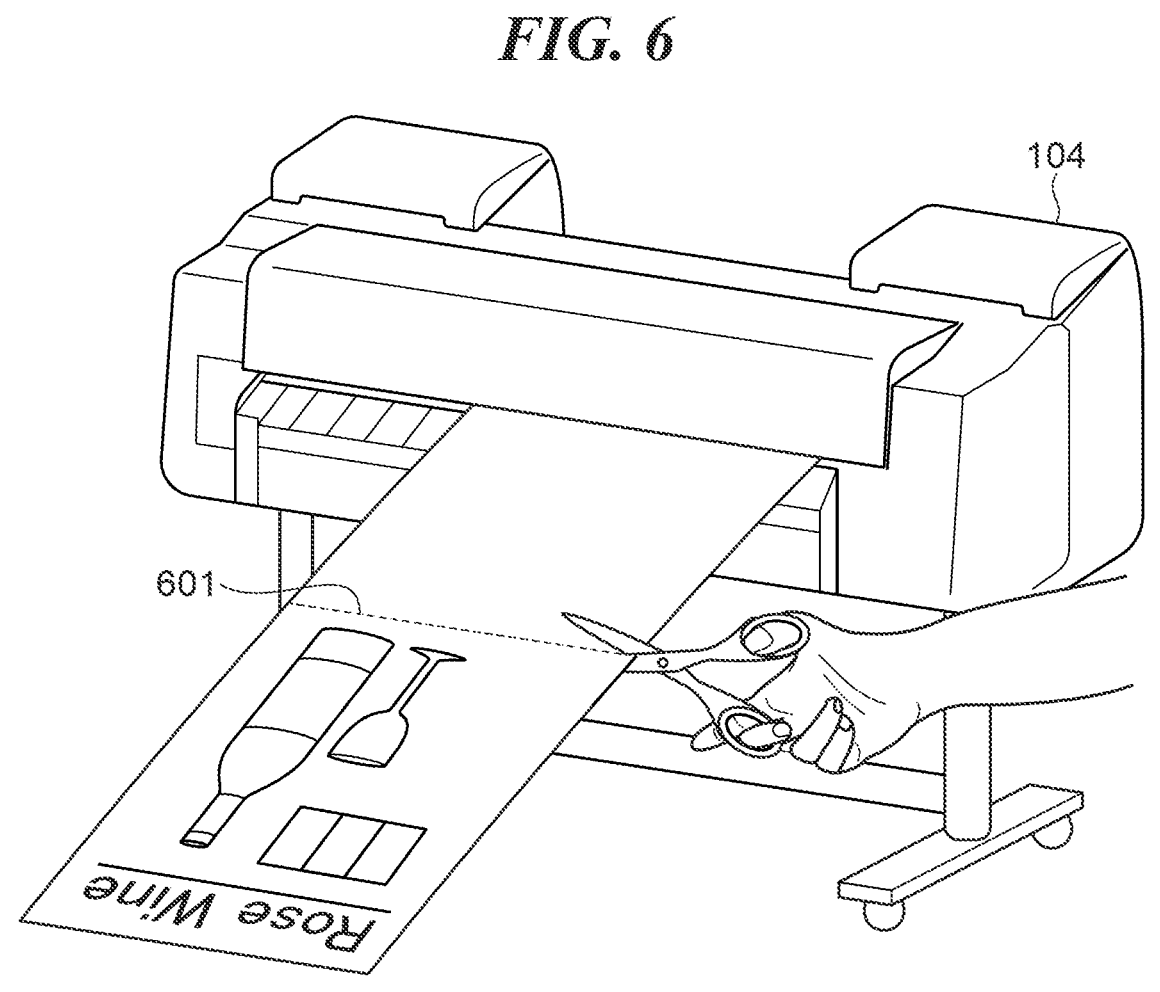

As shown in FIG. 5, among the item names 501, for example, "save job in printer", "job name abbreviation", and "cut line printing" are item names uniquely defined by the printer vendor. There are "ON" and "OFF" as the attribute values 502 belonging to "save job in printer", "job name abbreviation", and "cut line printing", respectively, which are also attribute values uniquely defined by the printer vendor. "Save job in printer" is an item for setting whether or not to save printing data received from the cloud print service 321 by the cloud print compatible printer 104 (hereinafter sometimes simply referred to as "a printer") in the printer after printing. "Job name abbreviation" is an item for setting whether or not to abbreviate and display the name given to the printing data when the cloud print compatible printer 104 displays bibliographic information of the printing data received from the cloud print service 321 on the display unit 246. As shown in FIG. 6, "cut line printing" is an item for setting whether or not to print the cut line 601 between pages of the printing data received by the cloud print compatible printer 104 from the cloud print service 321. FIG. 6 is a diagram that shows an example in which the cut line printed by the cloud print compatible printer is manually cut. "The cut line 601" is an auxiliary line that serves as a mark when the user cuts (cuts out) the paper sheet (for example, the roll paper sheet) by using scissors or the like in the process after printing. It should be noted that an attribute value unique to the printer vendor may be defined as the attribute value 502 corresponding to the item name 501 defined as the specification of the industry standard. For example, "folding setting" is the item name 501 defined by the IPP. On the other hand, "saddle folding", which is one of the attribute values 502 of "folding setting", is an attribute value uniquely defined by the printer vendor that collectively folds and discharges one or more paper sheets without binding the paper sheets by using a stapler.

In the present embodiment, the cloud print compatible printer 104 transmits the capability information to the cloud print service 321 according to the IPP. The cloud print compatible printer 104 registers the capability information by using a command prepared for registering the capability information in the cloud print service 321. The cloud print compatible printer 104 notifies the cloud print service 321 of the item name 501, the attribute value 502 corresponding to each item name 501, and a default value. The capability information notified here does not matter whether or not the item name 501 and the attribute value 502 are defined by the IPP. For example, the item names 501 of "save job in printer", "job name abbreviation", and "cut line printing" not defined by the IPP are also notified to the cloud print service 321 and registered therein. In Addition, "saddle folding", which is one of the attribute values 502 of the "folding setting", is also notified to the cloud print service 321 as an attribute value unique to the printer vendor, and registered therein.

As an example of a print ticket in which the capability information is described, a description is given as shown in FIG. 15A in the case that an automatic cutting function is turned on (ON) (the cut line printing is turned off (OFF)). FIG. 15A is a diagram that shows an example of the print ticket in the case that the automatic cutting function is ON. Further, in the case that the automatic cutting function is turned off (OFF) (the cut line printing is turned on (ON), color designation available, cut line type designation available), a description is given as shown in FIG. 15B. FIG. 15B is a diagram that shows an example of the print ticket in the case that the automatic cutting function is OFF. Here, "the print ticket" is printing setting data that handles the capability information and is described in extensible markup language (XML).

Figure 4:
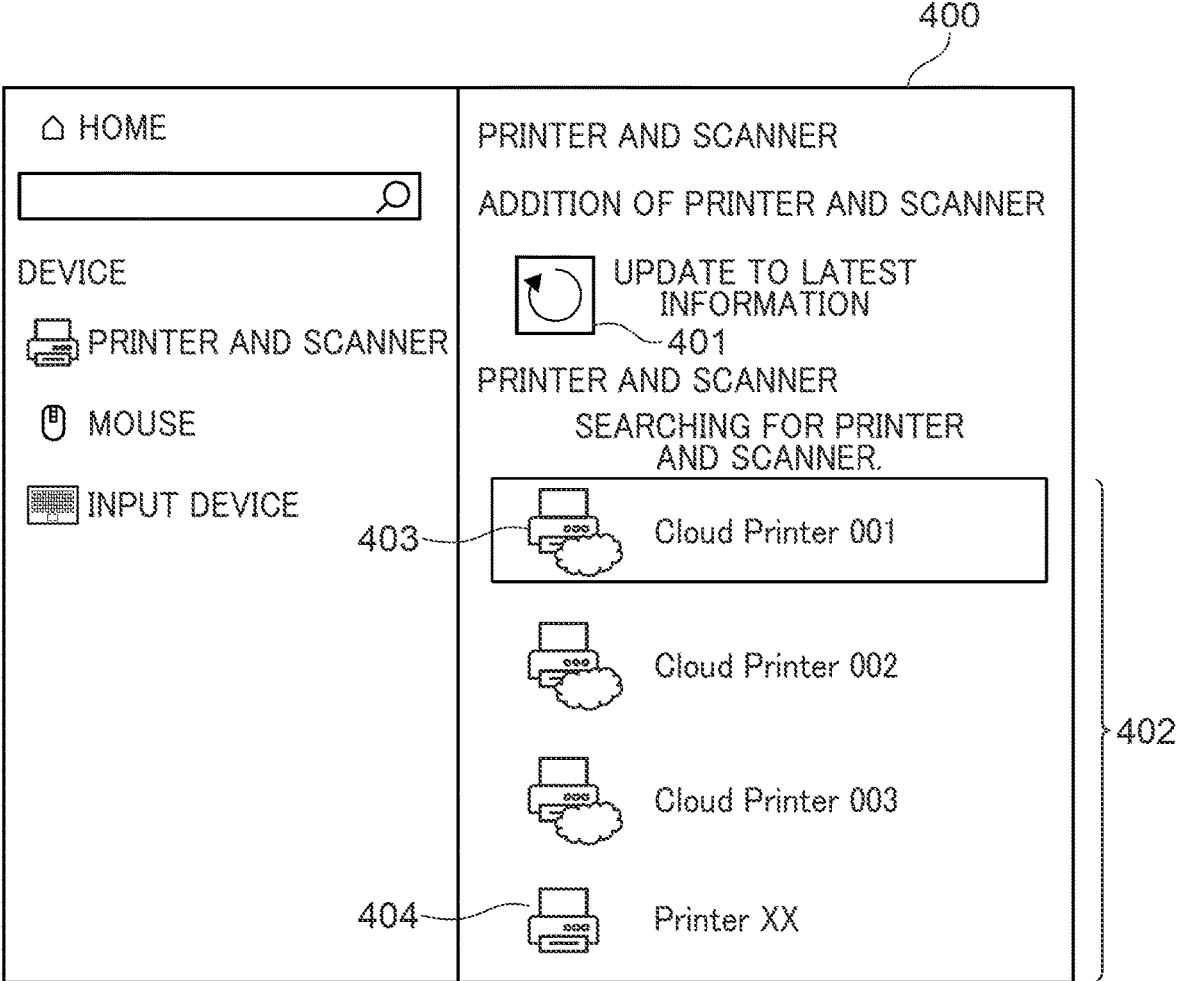
FIG. 4 is a screen related to a printer registered in a client terminal.

When the cloud print compatible printer 104 is registered in the client terminal 101, a standard printing function, which is one of the functions of the OS 313 of the client terminal 101, is used. As shown in FIG. 3, in a step S3002 after execution of the step S3001, the OS 313 (the control unit 211) of the client terminal 101 accepts (receives) a setup operation for performing printing by using the cloud print compatible printer 104, that is, accepts (receives) an operation of adding a printer. This setup operation is performed by allowing the user to operate a screen 400 (see FIG. 4) displayed on the display unit 216 of the client terminal 101. FIG. 4 is a screen related to the printer registered in the client terminal. As shown in FIG. 4, the screen 400 includes an object 401, an area 402, an icon 403, and an icon 404. When the user selects the object 401, a printer search instruction is inputted into the OS 313. Upon accepting (receiving) the printer search instruction, the OS 313 judges whether or not to hold an access token for the cloud print service 321. As a result of the judgement, in the case that it is judged that the OS 313 does not hold the access token (a token) therein, the OS 313 displays an input screen for inputting user information (a login name and a password) (not shown) on the display unit 216. On the other hand, in the case that it is judged that the OS 313 holds the access token therein, the processing proceeds to a step S3008.

In a step S3003, the OS 313 of the client terminal 101 transmits the user information inputted via the input screen to the cloud print service 321, and requests a user authentication and the access token.

In a step S3004, the cloud print service 321 performs a user authentication processing based on the user information received from the client terminal 101 in the step S3003. In the case that the user authentication processing is completed, the cloud print service 321 notifies the client terminal 101 of the result of the authentication processing.

Here, in the case that the user authentication is successful, in a step S3005, the OS 313 of the client terminal 101 acquires the access token from the cloud print service 321, and the processing proceeds to the step S3008. On the other hand, in the case that the user authentication fails, in a step S3006, the cloud print service 321 notifies the OS 313 of the client terminal 101 of an authentication error. In a step S3007 after the authentication error has been notified, the OS 313 of the client terminal 101 stops the authentication processing based on the information of the authentication error received in the step S3006. Then, the subsequent processing ends.

In the step S3008, the OS 313 of the client terminal 101 searches for a printer registered in the cloud print service 321 and a printer connected to the network 107. At this time, the OS 313 transmits an acquisition request for printer information, to which the access token is attached, to the cloud print service 321.

The access token attached to the acquisition request in the step S3008 is used to identify information on the printer permitted to be used by the user. In a step S3009, the cloud print service 321 transmits the printer information to the client terminal 101. It should be noted that the printer information includes a printer name allocated to the printer registered in the cloud print service 321 and an HWID of the printer.

Further, the OS 313 of the client terminal 101 acquires a printer list transmitted from the cloud print service 321 and identification information of printers within the printer list. It should be noted that, concurrent with the processing in the steps S3008 and S3009, the OS 313 of the client terminal 101 searches for a printer connected to the same network 107 as the client terminal 101. This search is a device search by mDNS, Bonjour, or the like. Then, the OS 313 displays the printer list on the display unit 216 based on the information on the printer acquired from the cloud print service 321 and the information on the printer detected by the search on the network 107. As shown in FIG. 4, the printer list is displayed in the area 402. Among the printers displayed in the area 402, "Cloud Printer 001", "Cloud Printer 002", and "Cloud Printer 003" are the information on the printer acquired from the cloud print service 321. Furthermore, "Printer XX" is the information on the printer detected by the search on the network 107. "Cloud Printer 001", "Cloud Printer 002", and "Cloud Printer 003" are each displayed with the icon 403 added thereto. "Printer XX" is displayed with the icon 404 added thereto, and the icon 404 is different from the icon 403. As a result, the user is able to grasp whether each printer within the printer list is the printer acquired from the cloud print service 321 or the printer detected by the search on the network 107. It should be noted that, in the printer list, the printer acquired from the cloud print service 321 may be displayed, and the printer detected by the search on the network 107 may be omitted. In addition, the user is able to select the printer information corresponding to the printer desired to be registered in the client terminal 101 from the printer list.

In a step S3010 after the selection of the printer, the OS 313 of the client terminal 101 inquires of the cloud print service 321 about the capability information of the selected printer. Which capability information is to be inquired is determined by the specification of the OS 313, that is, preset in the OS 313. Specifically, the OS 313 (an acquisition unit) judges whether or not to acquire the capability information according to the type of the item name 501. For example, in the case that the item name 501 is a setting item ("paper size", "paper type", "color mode", or the like) defined as a standard specification by the IPP, the OS 313 acquires the capability information including the item name 501.

In a step S3011, the cloud print service 321 transmits the capability information of the cloud print compatible printer 104 as a response to the OS 313 of the client terminal 101. As a result, the OS 313 is able to acquire the capability information (an acquisition step). It should be noted that, in the present embodiment, the OS 313 acquires the capability information from the cloud print service 321 (the cloud print server 102), but is not limited thereto, and may directly acquire the capability information from the cloud print compatible printer 104. In addition, in the present embodiment, the information registered in the cloud print service 321 in the step S3001 is transmitted to the client terminal 101 in the step S3011, but the present invention is not limited thereto. For example, the information registered in the cloud print service 321 may be transmitted to the client terminal 101 at a timing other than this transmission timing. In this case, for example, the information registered in the cloud print service 321 can be transmitted to the client terminal 101 along with a change in the capability information of the cloud print compatible printer 104. In addition, the user may issue an instruction to update the capability information on a user interface (for example, the screen of the display unit 246) provided by the cloud print service 321, and the capability information updated in response to the instruction may be transmitted to the client terminal 101. Further, at the execution timing in the step S3010, the cloud print service 321 may acquire the capability information from the cloud print compatible printer 104 and may transmit the acquired capability information to the client terminal 101.

In addition, in the step S3011, the cloud print service 321 replies with the attribute value 502 and the default value that belong to the item name 501 designated from the client terminal 101. Here, the attribute values 502 to be replied are all attribute values registered in the cloud print service 321 regardless of whether or not the attribute value is an attribute value defined by the IPP. The default value is a value in an initial state. It should be noted that, in the case that the attribute value 502 corresponding to the inquiry from the OS 313 is not stored, the cloud print service 321 does not make a response in the step S3011.

Next, the OS 313 starts installation of the cloud printer driver 311 based on the identification information or the printer name of the printer selected by the user. In a step S3012, the OS 313 generates a print queue of the cloud printer driver 311 having basic device capability information included in the OS 313. "The device capability information" is definition information necessary for generating the printing setting capability information of the cloud printer driver 311. For example, the device capability information is described in XML such as print device capabilities.

Thereafter, the OS 313 updates the device capability information of the cloud printer driver 311 by using the capability information acquired from the cloud print service 321. As described above, the client terminal 101 first registers the cloud printer driver 311 and the device capability information included in the OS 313 in the print queue in association with each other. Thereafter, the device capability information associated with the print queue is updated with the capability information acquired from the cloud print service 321. At this time, the OS 313 updates the device capability information by using only the attribute value 502 defined by the IPP among the pieces of capability information acquired from the cloud print service 321. It should be noted that, for example, in the acquisition of the capability information, even in the case that the attribute value 502 unique to the vendor is acquired as a paper type (the type of the paper sheet), the attribute value 502 is not added to the device capability information. As a result, it is possible to set a printing setting value that cannot be set in the device capability information included in the OS 313. As described above, the installation of the cloud printer driver 311 is completed. As a result, it is possible to transmit the printing data from the client terminal 101 to the print queue for the cloud print compatible printer 104 generated by the OS 313.

Next, the OS 313 starts an installation processing of the printing setting extension application 312 that extends the function of the cloud printer driver 311 in association with the printer. In this installation processing, first, the OS 313 performs an identification additional information adding processing with respect to the device identification information. The identification additional information adding processing is a processing necessary when the extended setup information file 700 (see FIG. 7) is acquired from the online support server 105, and a character string different from normal device identification information is added. In the present embodiment, in order to distinguish the application from an application of another device, the OS 313 adds identification additional information "PrinterApp_", which indicates that the application is an application corresponding to a printer, to the device identification information. It should be noted that "PrinterApp_" is an example, and may be a character string, a number, or a symbol different from the character string ("PrinterApp_"). As a result of the identification additional information adding processing, for example, in the case that the device identification information of the cloud print compatible printer 104 is "device001", the device identification information after the identification additional information adding processing becomes "PrinterApp_device001".

As shown in FIG. 3, in a step S3013, the OS 313 requests the online support service 351 to search for the extended setup information file 700 including the device identification information with additional information as a search target. According to the request in the step S3013, "PrinterApp_device001", to which the identification additional information is added, is notified to the online support service 351.

The online support service 351 stores the extended setup information file 700 (see FIG. 7). FIG. 7 is a diagram that shows an example of the extended setup information file.

The extended setup information file 700 is a file generated by the vendor of the cloud print compatible printer 104 and registered in the online support service 351. The extended setup information file 700 describes an application identifier for specifying the printing setting extension application 312 to be used for setting of the printing data to be sent (transmitted) to the cloud print compatible printer 104. In the extended setup information file 700 shown in FIG. 7, an item 701 of "PackageFamilyName" is identification information of the printing setting extension application 312. Meanwhile, "PrinterHardwareID" is a character string 702 obtained by adding the identification additional information to the identification information of the cloud print compatible printer 104. It should be noted that the online support service 351 stores extended setup information in which identification information of a printer driver is described, in addition to the extended setup information file 700 in which the identification information (the item 701) of the printing setting extension application 312 is described. In the extended setup information file in which an identifier of the printer driver is described, the identifier of the printer driver is described in "PackageFamilyName". Further, the device identification information in which the identification additional information is not written is described in the "PrinterHardwareID" of the extended setup information file. As described above, the online support service 351 stores the extended setup information file in which the identifier of the printer driver is described and the extended setup information file in which the identifier of the printing setting application is described. Therefore, the OS 313 adds the identification additional information to the device identification information in order to appropriately acquire the necessary extended setup information file.

After receiving the search request in the step S3013, the online support service 351 specifies the extended setup information file. The extended setup information file is an extended setup information file in which the device identification information with the identification additional information designated in the request and "PackageFamilyName" in the extended setup information file match each other.

As shown in FIG. 3, in a step S3014, upon storing the extended setup information file 700 including the device identification information as the search target, the online support service 351 returns the extended setup information file 700 to the OS 313. At this time, the contents of the extended setup information file 700 are written into a registry of the OS 313.

In a step S3015, the OS 313 installs the extended setup information written into the extended setup information file 700 acquired from the online support service 351 in association with the print queue generated in the step S3012.

In a step S3016, the OS 313 extracts an application ID from the extended setup information installed in the step S3015. "The application ID" is an identifier defined by "PackageFamilyName" in the extended setup information file 700. The processing up to this point is processing in the case that the extended setup information file 700 corresponding to the cloud print compatible printer 104 is stored in the online support service 351.

On the other hand, the extended setup information file 700 including the device identification information as the search target may not be detected. In this case, in a step S3017, the OS 313 completes the installation of the cloud printer driver 311 and stops the application installation processing. The processing in the step S3017 is executed, for example, in the case that the extended setup information file 700 cannot be received within a predetermined period of time from the search request in the step S3013 or in the case that an error notification is received from the online support service 351.

The processing after a step S3018 is a processing in the case that the extended setup information file 700 can be acquired and the application ID can be extracted in the step S3016. In the step S3018, the OS 313 requests the application management service 331 to search for an application having the matching application ID extracted above. The application management service 331 stores an application operating (running) on the client terminal 101 and an application ID, which is an identifier of the application, in association with each other. The application and the application ID are registered in the application management service 331 by the vendor that provides the cloud print compatible printer 104.

In the case that the application management service 331 stores the printing setting extension application 312 that matches the application ID mentioned in the step S3018, the processing proceeds to a step S3019. In the step S3019, the application management service 331 returns the printing setting extension application 312 to the client terminal 101. The printing setting extension application 312 returned in the step S3019 is an application to which the same ID as the application ID is allocated.

In a step S3020, the OS 313 of the client terminal 101 installs the printing setting extension application 312 transmitted in step S3019 in association with the print queue on the client side. After completion of the installation, the OS 313 stores the application ID as print queue information in the registry. In addition, the printing setting extension application 312 performs setting to issue an event notification to the OS 313 at the timing when the print queue associated with the application is set on a printing setting screen. The printing setting extension application 312 installed in a step S3020 is activated after the client terminal 101 is powered on and the OS 313 is activated. Thereafter, the printing setting extension application 312 operates as a background task.

On the other hand, in the case that the application management service 331 does not store the printing setting extension application 312 that matches the application ID mentioned in the step S3018, the processing proceeds to a step S3021. In the step S3021, the OS 313 stops the application installation processing. In this case, the print queue generated above and the cloud printer driver 311 are installed in association with each other. Further, the printing setting extension application 312 ends without being associated with the print queue.

It should be noted that, in the above processing, the extended setup file is searched by adding a predetermined character string to the device identification information of the cloud print compatible printer 104, but the present invention is not limited thereto. For example, in the case that a file for installing a printer driver can be distinguished, the search may be performed without adding the predetermined character string.

Figure 8:
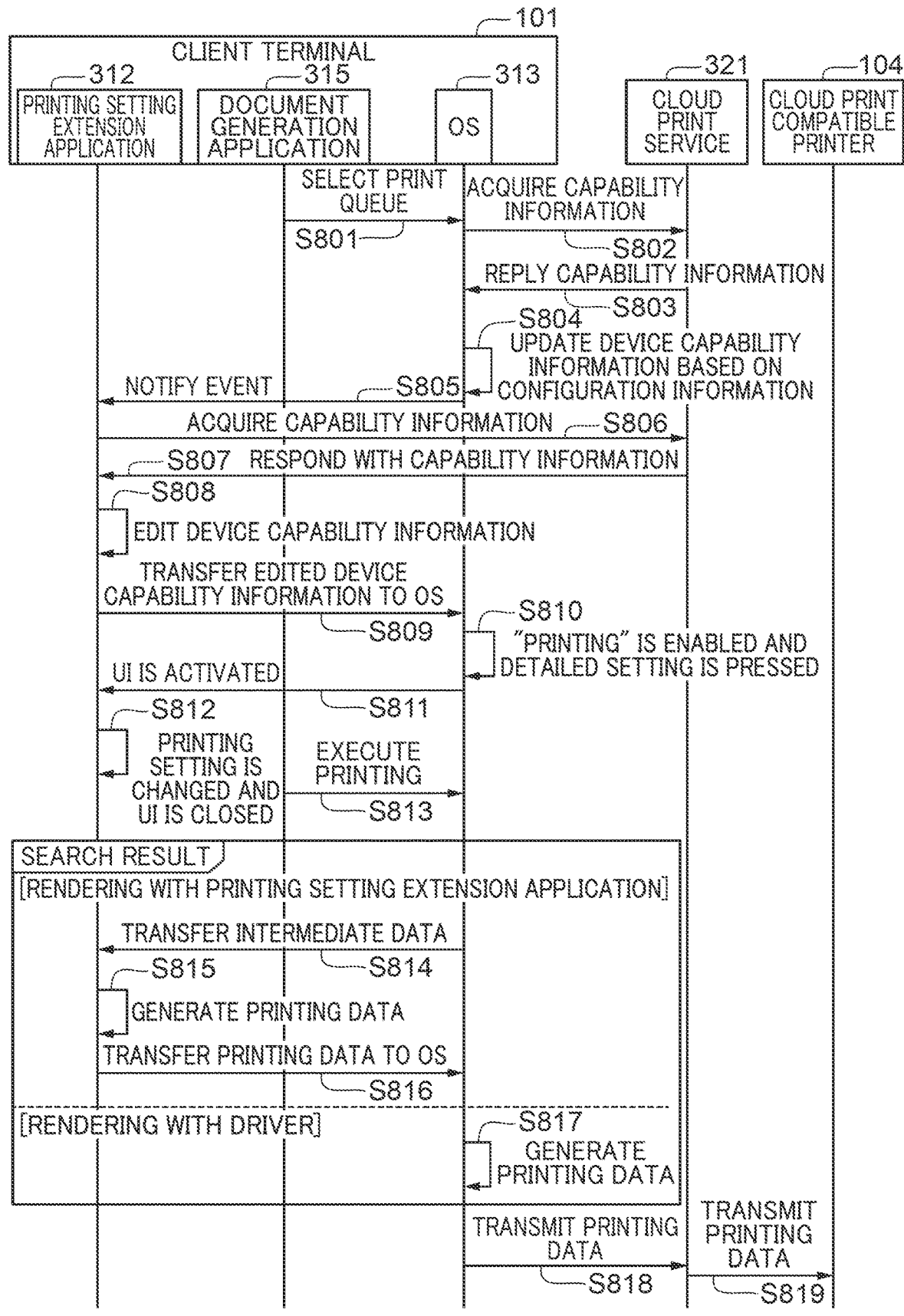
FIG. 8 is a sequence that shows an example of a processing performed until printing setting is performed by the printing setting extension application and printing data is transmitted.

Next, a description will be given as to a sequence executed between the printing setting extension application 312, a document generation application 315, and the OS 313 of the client terminal 101, the cloud print service 321, and the cloud print compatible printer 104 with reference to FIG. 8. FIG. 8 is a sequence showing an example of a processing performed until a printing setting is performed by the printing setting extension application and printing data is transmitted.

Figure 11:
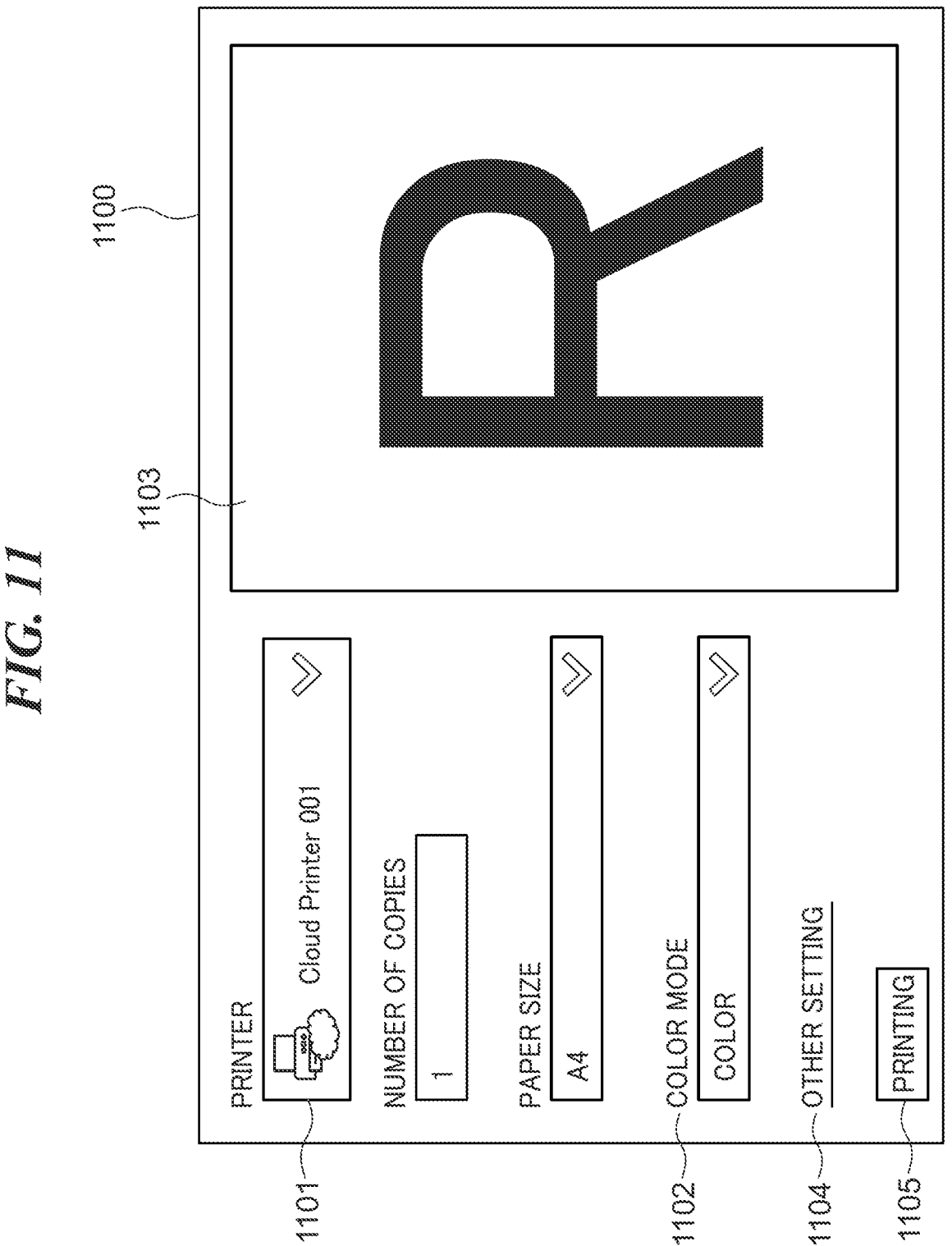
FIG. 11 is a diagram that shows an example of the printing setting screen displayed by a document generation application.

The document generation application 315 is an application such as a document data generation application, a presentation material generation application, or a photo or an image data display application. The document generation application 315 is installed in the client terminal 101 in advance. The document generation application 315 displays a printing setting initial screen 1100 (see FIG. 11) as a printing setting screen for selecting a print queue on the display unit 216. The printing setting initial screen 1100 includes an object 1101 for selecting a print queue, an object 1102 for performing various printing settings, and a printing preview image 1103. In addition, the printing setting initial screen 1100 includes an object 1104 for performing other settings and an object 1105 for inputting a printing instruction. FIG. 11 is a diagram showing an example of the printing setting screen displayed by the document generation application. In FIG. 11, a "color mode" is set as an example of the object 1102, and "color", "black and white", and the like are included therein. It should be noted that the printing setting initial screen 1100 is displayed by the document generation application 315 in the present embodiment, but is not limited thereto, and may be displayed by, for example, the OS 313.

As shown in FIG. 8, in step S801, the OS 313 selects a print queue. The print queue is associated with a printer set as a default printer. In the present embodiment, it is assumed that the cloud print compatible printer 104 is selected as the default printer. It should be noted that the processing after step S801 is also executed in the case that the user operates the object 1101 on the printing setting initial screen 1100 to change the printer.

In a step S802, the OS 313 inquires of the queue on the cloud corresponding to the cloud print compatible printer 104 of the cloud print service 321 about the capability information of the cloud print compatible printer 104. As described above, which capability information is inquired is determined in advance in the specification of the OS 313. Therefore, the capability information acquired at this timing is similar to that acquired in step S3001 of the sequence shown in FIG. 3. The inquiry is made to the cloud print compatible printer 104 using, for example, a command of a standard protocol defined by the IPP, such as Get-print-Attributes. In the case of using the Get-print-Attributes, the capability information determined by the OS 313 is inquired in a list format.

In a step S803, the cloud print service 321 returns the capability information of the cloud print compatible printer 104 to the OS 313. This capability information is obtained from a list of capability information sent by Get-print-Attributes including duplex printing. For example, it is assumed that the item name 501 "paper size (media size)" is designated in Get-print-Attributes (IPP). In the case that the cloud print service 321 stores the attribute value 502 of the paper size, the cloud print service 321 replies with "A4", "B5", "Letter", or the like, which is the attribute value 502. In the case that the attribute value 502 designated by the Get-print-Attributes does not exist in the queue of the cloud print compatible printer 104 of the cloud print service 321, the cloud print service 321 does not respond with the associated attribute value 502. The capability information acquired in step S803 is capability information that can be inquired regardless of the type or capability of the printer to which the OS 313 is connected.

In a step S804, the OS 313 updates the device capability information using the capability information acquired from the cloud print service 321 in the step S803. Specifically, the OS 313 adds the capability information acquired in the step S803 to the device capability information generated in step S3012 of the sequence shown in FIG. 3. Then, in the case that there is an update in the device capability information, the device capability information managed by the client terminal 101 can be updated by executing processing in the step S804. It should be noted that the update of the device capability information in the step S804 is performed only for the attribute value 502 defined by the specification of the industry standard.

In a step S805, the OS 313 notifies the printing setting extension application 312 of an application programming interface (API) used for editing the event and the device capability information. This notification timing is registered when the printing setting extension application 312 is installed in the OS 313 of the client terminal 101.

Upon receiving this notification, the printing setting extension application 312 requests the cloud print service 321 to acquire the capability information. The acquisition of the capability information performed here is acquisition of capability information for writing the item name 501 and the attribute value 502 uniquely defined by the printer vendor into the device capability information. Therefore, in a step S806, upon receiving the notification from the OS 313, the printing setting extension application 312 inquires about the capability information of the cloud print compatible printer 104 via the cloud print service 321. At this time, the printing setting extension application 312 inquires of the cloud print service 321 about the capability information including the item name 501 unique to the printer vendor and the attribute value 502 unique to the printer vendor. This inquiry is performed by using Get-print-Attributes as in the step S802. It should be noted that, in the present embodiment, in the step S806, the capability information including the item name 501 uniquely defined by the printer vendor and the attribute value 502 uniquely defined by the printer vendor is acquired. It should be noted that, in the capability information acquisition by the OS 313, the capability information may also be acquired for the acquired item name 501.

In a step S807, in the case that the printing setting extension application 312 makes an inquiry about the capability information in step S806, the cloud print compatible printer 104 responds with the capability information via the cloud print service 321. The response method here is similar to the method in step S3011 of the sequence shown in FIG. 3. In the present embodiment, in the step S807, the cloud print service 321 responds with the capability information of the cloud print compatible printer 104 stored in the cloud print service 321. It should be noted that, in the step S807, after receiving the request in the step S806, the cloud print service 321 may reacquire the capability information from the cloud print compatible printer 104 and respond to the client terminal 101.

In a step S808, the printing setting extension application 312 acquires the capability information from the cloud print compatible printer 104 via the cloud print service 321 (the acquisition step), and then edits the device capability information managed by the OS 313 with a configuration information object. The "configuration information object" is a set of data groups necessary for editing the device capability information. In the present embodiment, the printing setting extension application 312 cannot directly edit the device capability information included in the OS 313. Therefore, the device capability information in the OS 313 is changed using the configuration information object. Specifically, in the step S808, the capability information (the second information) including "cut line printing", "save job in printer", and the like acquired in the step S807 is converted into the device capability information and added to the configuration information object, thereby editing the device capability information. By executing the processing up to the step S808, the item name 501 and the attribute value 502 unique to the printer vendor are stored in the device capability information in addition to the standard capability information acquired by the inquiry of the OS 313.

Next, in a step S809, the printing setting extension application 312 transfers the device capability information edited in the step S808 to the OS 313. Then, the OS 313 stores the device capability information acquired from the printing setting extension application 312 in association with the print queue.

In a step S810, upon updating the device capability information, the OS 313 enables an object serving as a trigger for displaying a user interface (UI) of the printing setting extension application 312. Hereinafter, the user interface (UI) of the printing setting extension application 312 will be referred to as a "second display (see FIGS. 10A, 10B, 10C, 10D, 10E, and 10F)". The second display displays the above-described second information on the screen, which will be described below. In addition, the object serving as the trigger for displaying the second display is the object 1104 of the printing setting initial screen 1100 shown in FIG. 11 in the present embodiment. The object 1104 functions as an operation unit configured to perform an operation of switching (changing) the display state on the display unit 216 from a state in which a first display (see FIG. 11) is displayed to a state in which the second display is displayed. It should be noted that, in the first display, the first information described above is displayed on the screen. Furthermore, the operation unit is not limited to one that displays an image, and for example, may be configured by a mechanical part such as a push button member or the like. The user includes a user who does not mind a state in which the display state of the display unit 216 at the time of executing printing remains as the first display, and a user who wants to switch the first display to the second display and needs to perform an operation on the second display. By the object 1104, the display state on the display unit 216 can be selected according to a request of the user. It should be noted that the object 1104 is grayed out until the processing in the step S810 is completed, and the UI (the printing setting screen 100) of the printing setting extension application 312, that is, the second display is not displayed even if the user performs an operation. In the case that the processing in the step S810 is completed, the grayed-out of the object 1104 is released, and the user can operate the object 1104.

In the case that the user operates the object 1104, in a step S811, the printing setting extension application 312 is activated and displays the printing setting screen 100 shown in FIGS. 10A, 10B, 10C, 10D, 10E, and 10F as the second display. FIGS. 10A, 10B, 10C, 10D, 10E, and 10F are diagrams showing an example of the printing setting screen displayed in the case that the printing setting extension application is installed. The printing setting screen 100 is displayed regardless of the type of the document generation application 315.

Figure 9A:
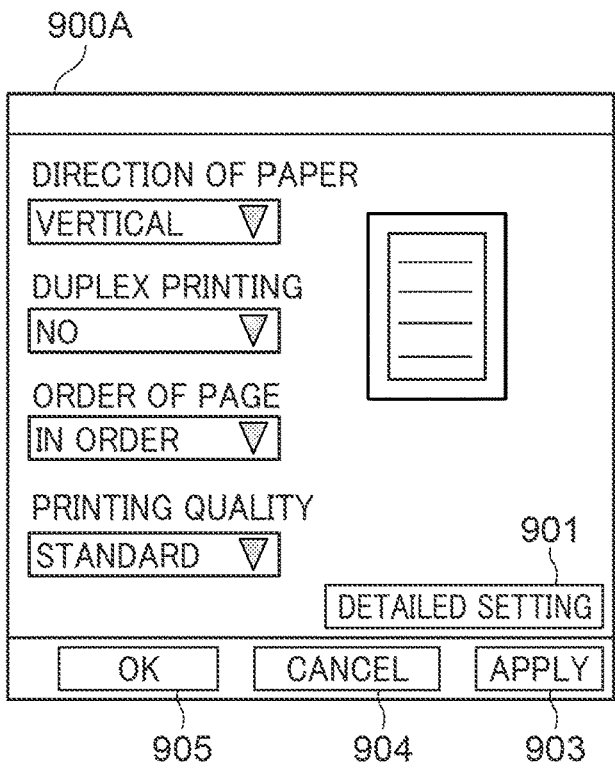
FIGS. 9A, 9B, 9C, and 9D are diagrams that show an example of a standard printing setting screen displayed in a case that the printing setting extension application is not associated with a print queue.

Here, a description will be given as to as a screen display in the case that the printing setting extension application 312 is not associated with the selected print queue. FIGS. 9A, 9B, 9C, and 9D are diagrams showing an example of a standard printing setting screen displayed in the case that the printing setting extension application is not associated with the print queue. A standard printing setting screen 900A shown in FIG. 9A is installed in the OS 313 in advance. The standard printing setting screen 900A includes a detailed setting button 901, an application button 903, a cancel button 904, and an OK button 905 in addition to the items of "direction of paper", "duplex printing", "order of page", and "printing quality".

Figure 9B:
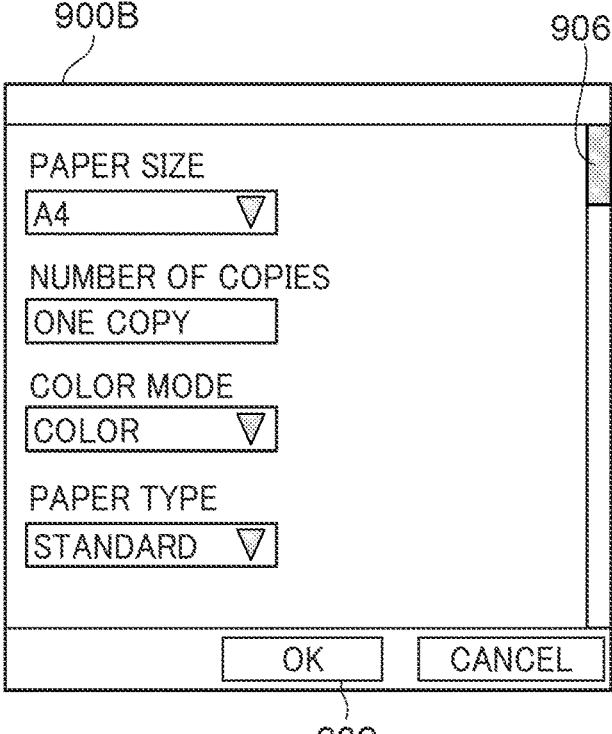
Figure 9C:
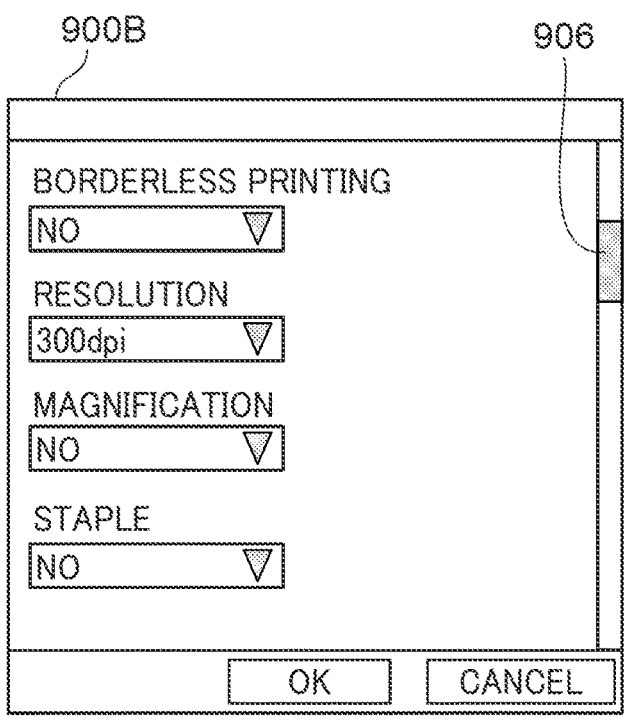
Figure 9D:
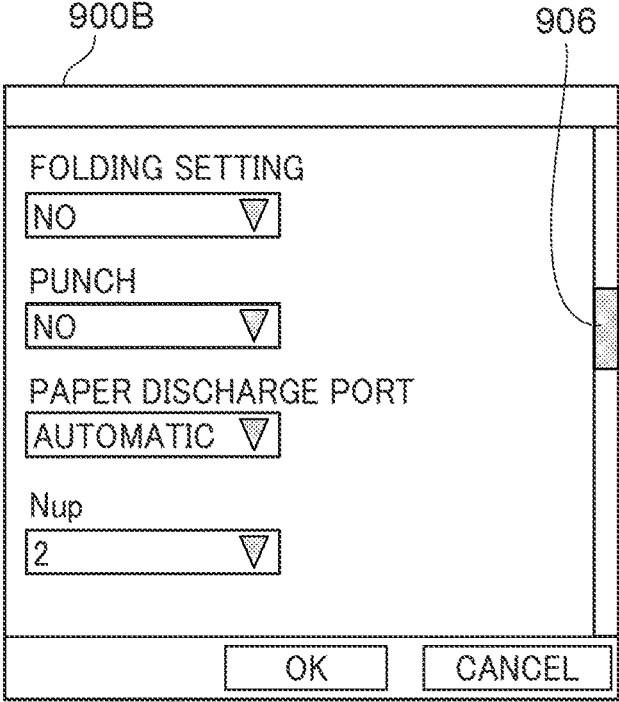

The display of the standard printing setting screen 900A is switched to a detailed printing screen 900B shown in FIG. 9B by operating the detailed setting button 901. The detailed printing screen 900B is a detailed printing screen for setting setting items that cannot be displayed in FIG. 9A. The detailed printing screen 900B is scrolled by operating a scroll bar 906. As a result, as shown in FIGS. 9C and 9D, a plurality of setting items supported by the OS 313 are displayed, and printing setting can also be performed for these setting items. By operating an OK button 902 on the detailed printing screen 900B, the printing settings set on the detailed printing screen 900B are saved, and the screen can be returned to the standard printing setting screen 900A shown in FIG. 9A. The application button 903 on the standard printing setting screen 900A is a button for saving the printing settings, and the cancel button 904 is a button for returning to the printing setting initial screen 1100 (see FIG. 11) without saving the printing settings. Further, the printing settings are saved by operating the OK button 905 on the standard printing setting screen 900A, and the screen returns to the printing setting initial screen 1100. It should be noted that, in the standard printing setting screen 900A and the detailed printing screen 900B, the item name 501 and the attribute value 502 uniquely defined by the printer vendor cannot be set.

Here, the printing setting extension application 312 will be described again. The printing setting extension application 312 receives the printing setting information based on the printing setting capability information generated from the device capability information by the OS 313, and displays the printing setting screen (extended printing setting screen) 100 shown in FIGS. 10A, 10B, 10C, 10D, 10E, and 10F on the display unit 216. The printing setting screen 100 is scrolled by operating a scroll bar 1003. As a result, as shown in FIGS. 10A, 10B, 10C, 10D, 10E, and 10F, the display content of the printing setting screen 100 is changed, and as such each printing setting item can be set. The printing setting screen 100 includes the second display in which the above-described second information is displayed on the screen.

Figure 10A:
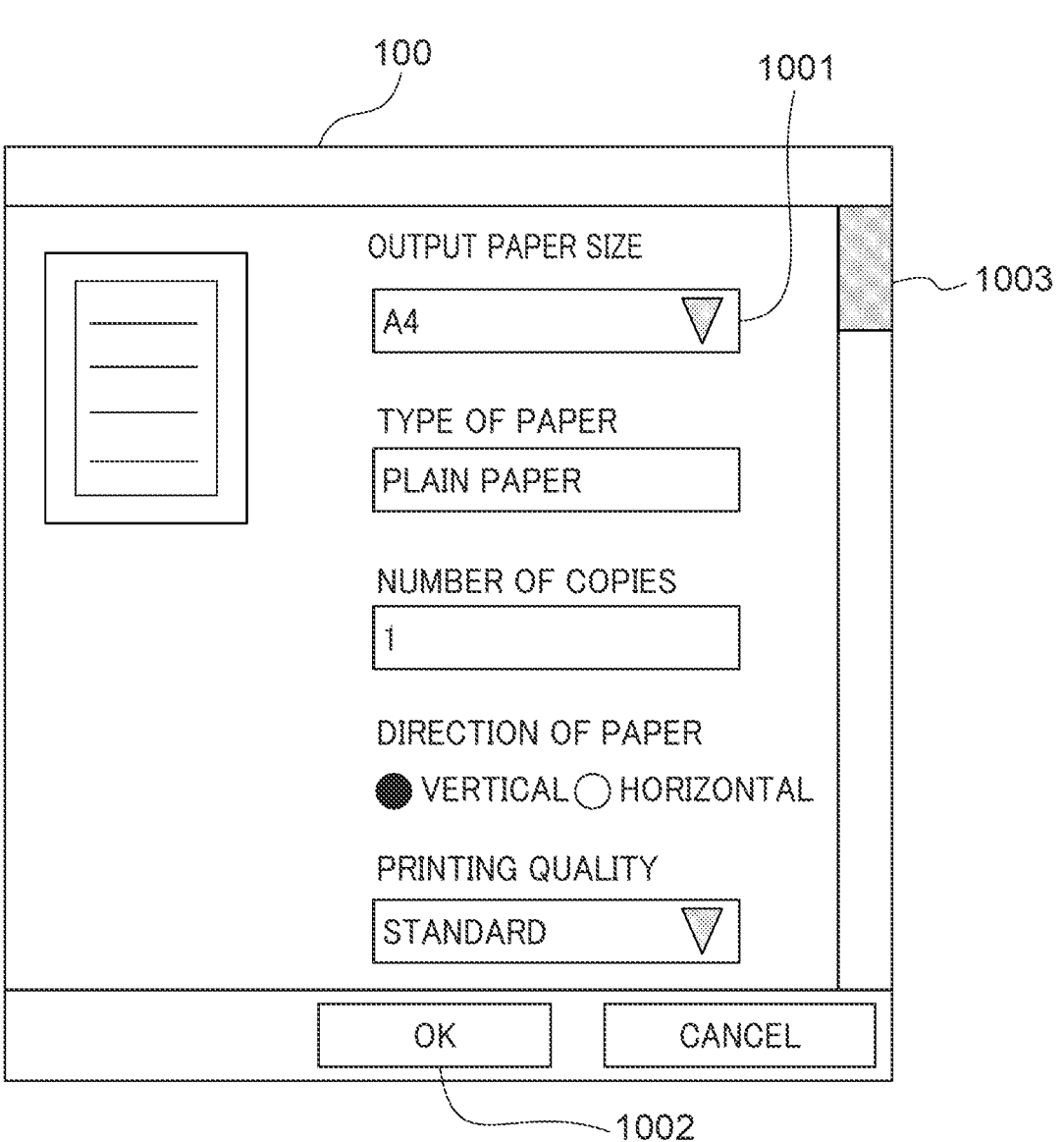
FIGS. 10A, 10B, 10C, 10D, 10E, and 10F are diagrams that show an example of a printing setting screen displayed in a case that the printing setting extension application is installed.
Figure 10B:
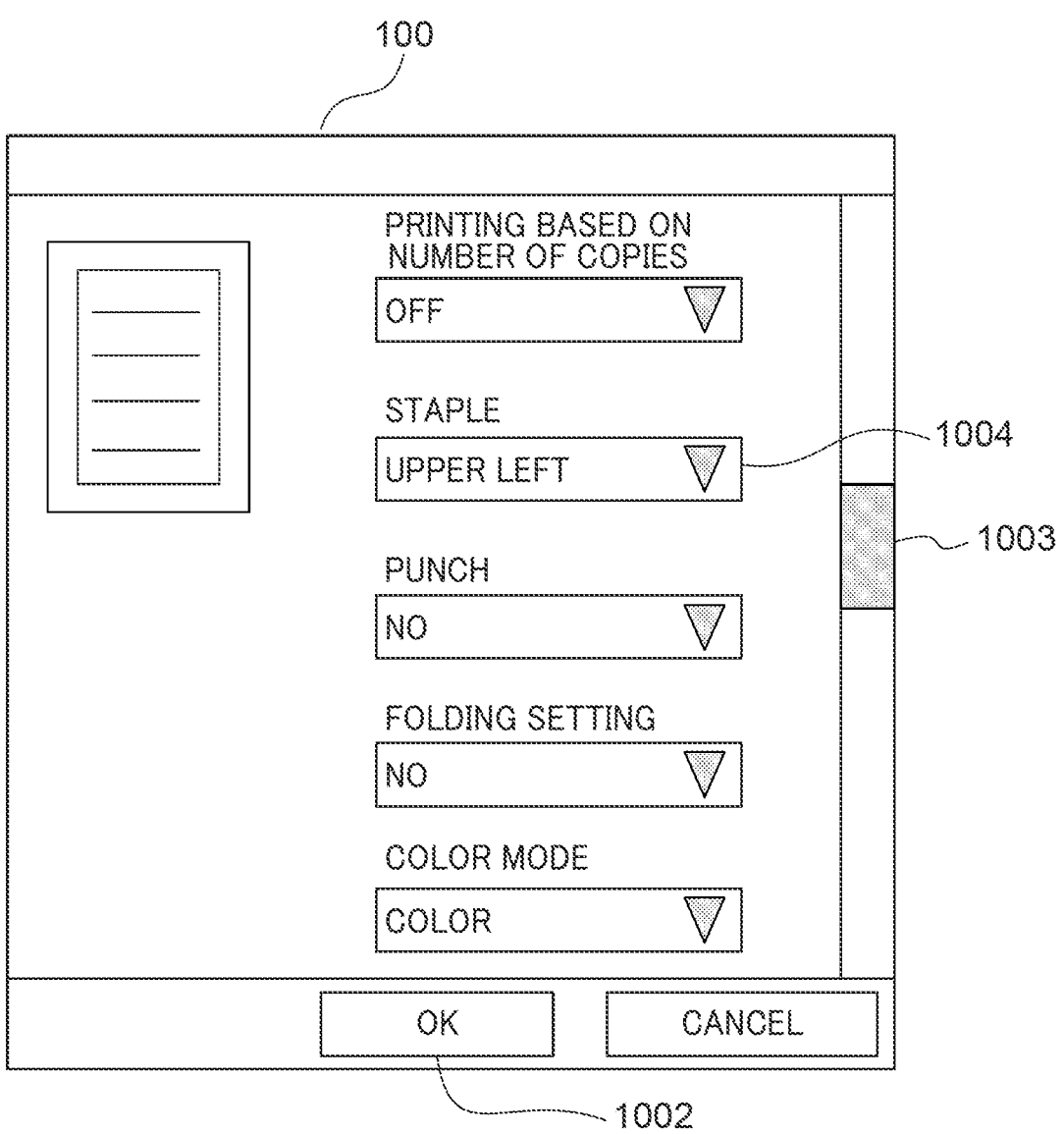
Figure 10C:
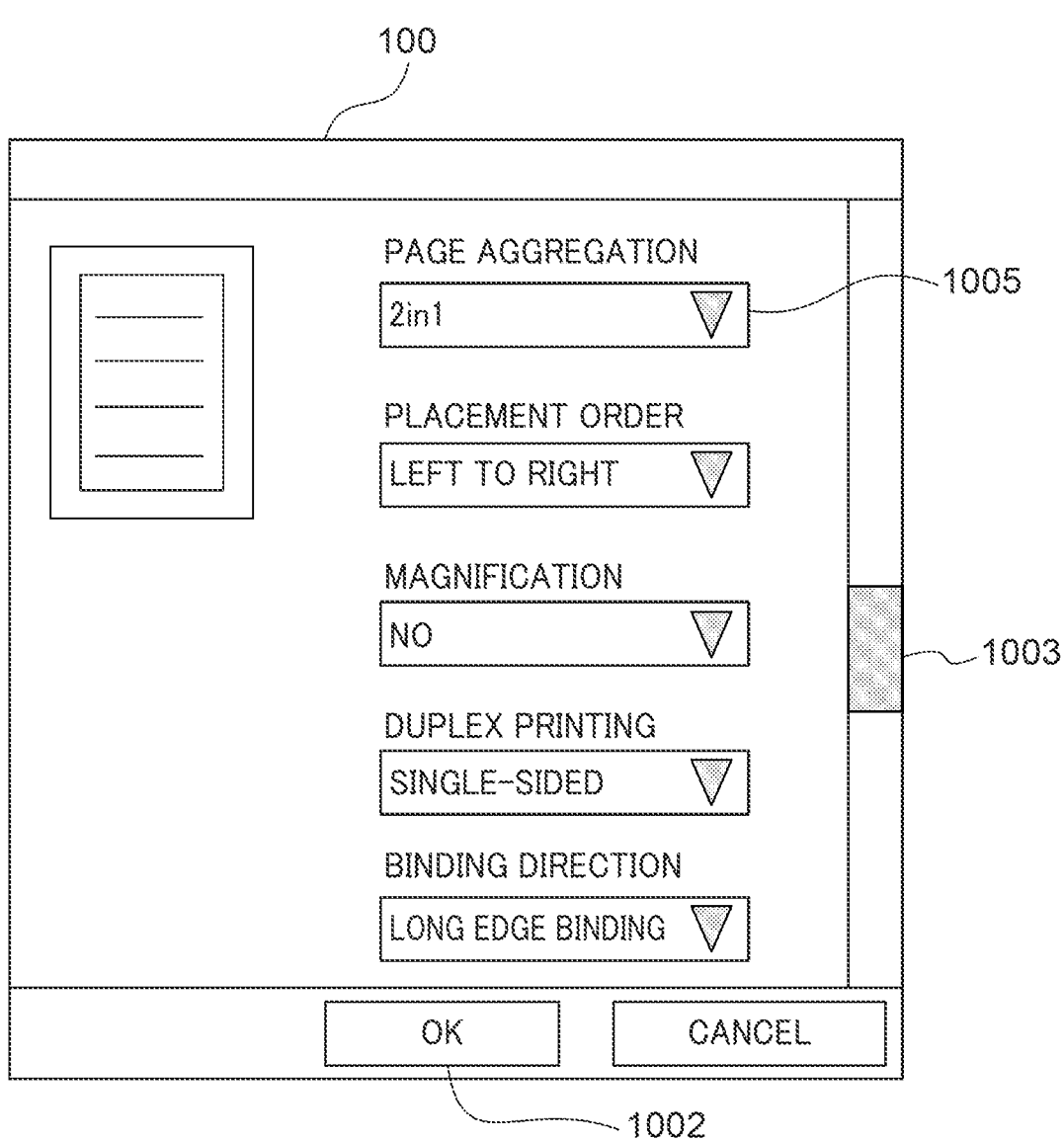
Figure 10D:
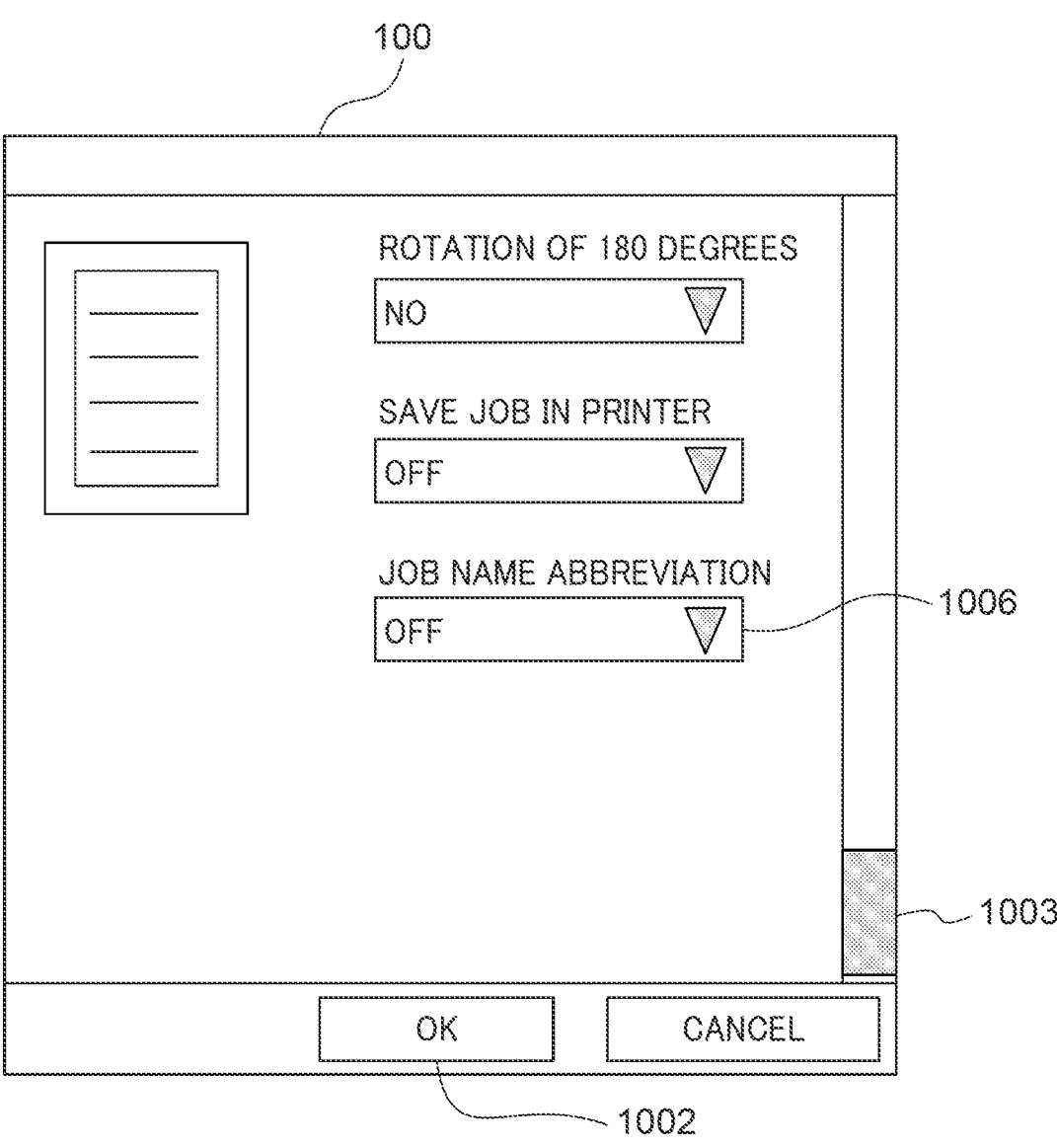
Figure 10E:
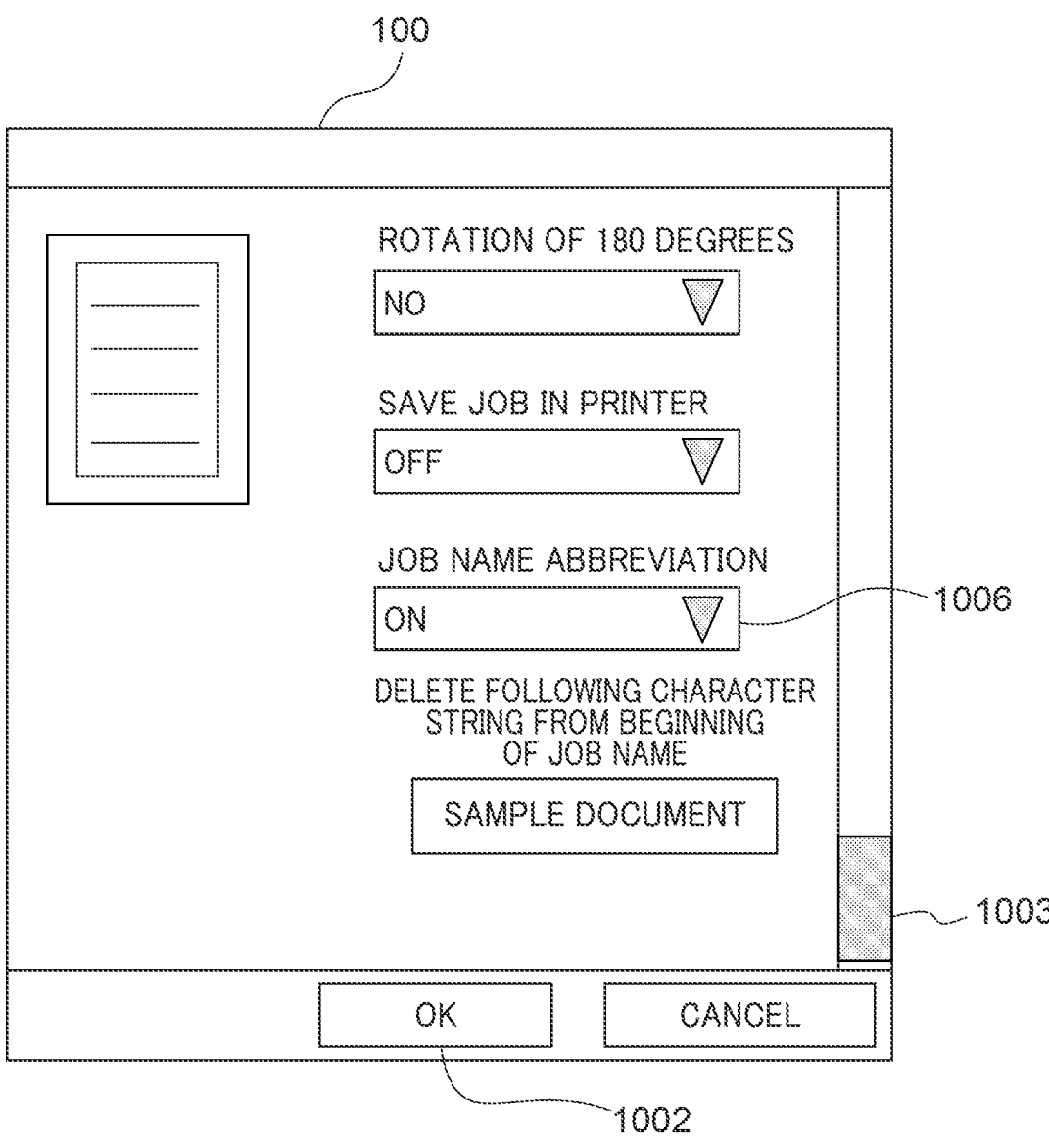

The printing setting screen 100 in the state shown in FIG. 10A includes, for example, "output paper size" as a setting item 1001. By selecting the setting item 1001, the paper size used at the time of output can be set to, for example, "A4". The printing setting screen 100 in the state shown in FIG. 10B includes, for example, "staple" as a setting item 1004. By selecting the setting item 1004, the stapling position can be set to, for example, "upper left". The printing setting screen 100 in the state shown in FIG. 10C, includes, for example, "page aggregation" as a setting item 1005. By selecting the setting item 1005, the number of pages to be aggregated per sheet of paper can be set to, for example, "2 pages/i sheet (2 in 1)". The printing setting screen 100 in the state shown in FIGS. 10D and 10E includes, for example, "job name abbreviation" as a setting item 1006. By selecting the setting item 1006, it is possible to set whether the name given to the printing data is abbreviated and displayed (see FIG. 10E) or not displayed (see FIG. 10D).

Figure 10F:
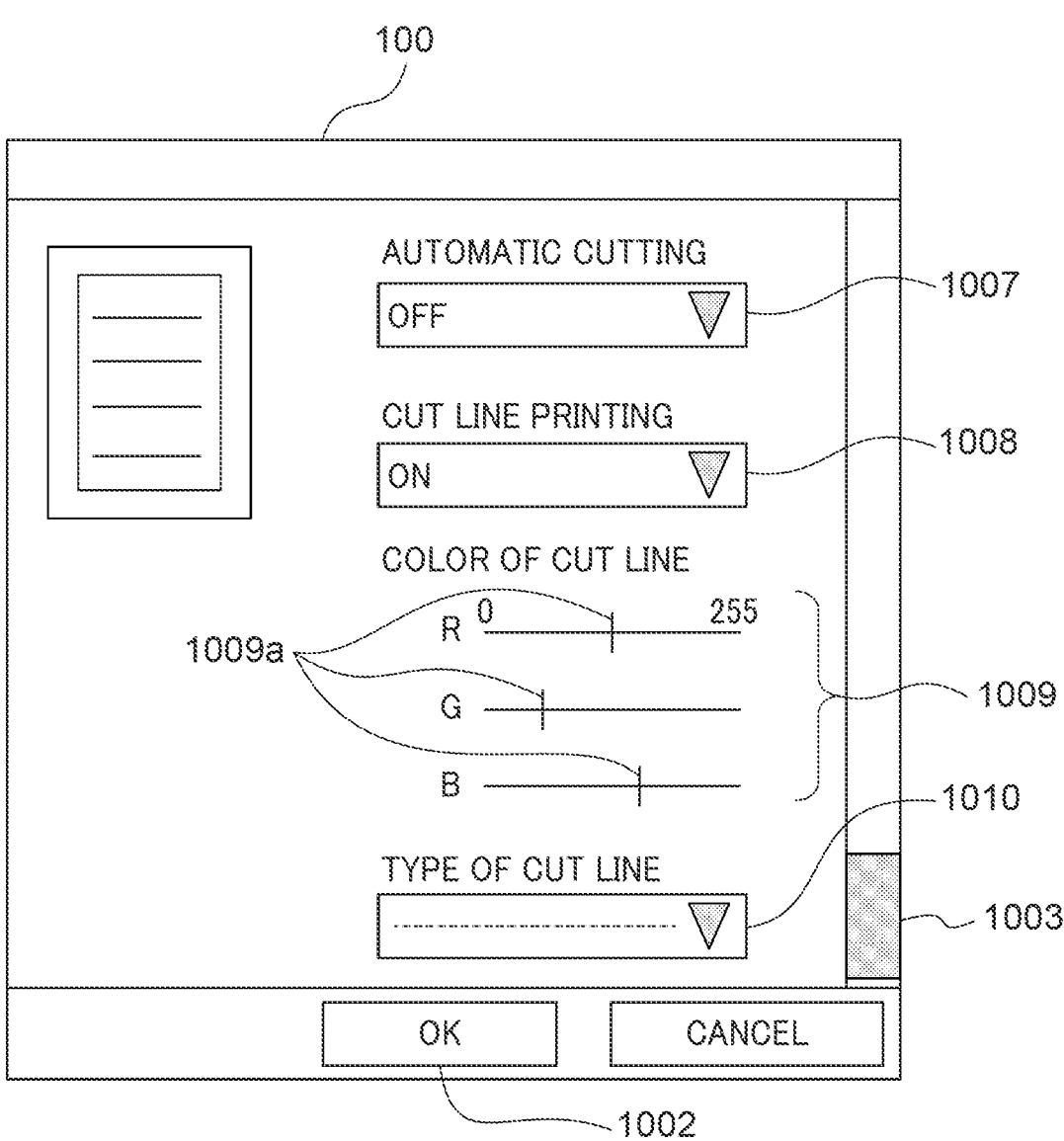

The printing setting screen 100 in the state shown in FIG. 10F includes "automatic cut" as a setting item 1007. The printing setting screen 100 also includes "cut line printing" as a setting item 1008, "color of cut line" as a setting item 1009, and "type of cut line" as a setting item 1010. Each of the setting items 1008 to 1010 is the second display in which the second information is displayed on the screen. The setting item 1007 is an instruction section configured to instruct an operation of the paper cutting unit 249 of the cloud print compatible printer 104. By selecting the setting item 1007, it is possible to set whether to operate the paper cutting unit 249, that is, to enable (turn ON) the operation of the paper cutting unit 249 or disable (turn OFF) the operation of the paper cutting unit 249.

The setting item 1008 is a print selection section in which it is possible to select whether to print the cut line 601 between pages of the printing data. By selecting the setting item 1008, it is possible to set whether to print the cut line 601, that is, to turn on the printing of the cut line 601, or to omit the printing of the cut line 601, that is, to turn off the printing of the cut line 601. The setting item 1009 is a color selection section in which it is possible to select the color of the cut line 601 in the case that it is selected to print the cut line 601 in the setting item 1008. The setting item 1009 includes an adjustment bar 1009a that adjusts each color tone of "R (red)", "B (blue)", and "G (green)". By appropriately moving each adjustment bar 1009a, the color of the cut line 601 can be set to a desired color. The setting item 1010 is a line type selection section in which it is possible to select the type of the cut line 601, that is, the line type, in the case that it is selected to print the cut line 601 in the setting item 1008. By selecting the setting item 1010, the type of the cut line 601 can be set to, for example, a "broken line (a dotted line)". It should be noted that examples of the type of the cut line 601 include a "solid line" and a "double line" in addition to the "broken line".

In FIG. 10F, the setting items 1007 to 1010 are collectively displayed. As a result, it is possible to quickly grasp what kind of items are provided as the items related to the cut line 601. It should be noted that the present invention is not limited to such collective display. For example, in the case that the setting items 1007 to 1010 do not fit in one screen, the setting items 1007 to 1010 may be displayed in order by operating the scroll bar 1003 (a scroll operation).

In addition, in the case that the operation of the paper cutting unit 249 is set to be enabled (ON) in the setting item 1007, the operation on the screen display of the second information is disabled, that is, the selection (setting) in the setting items 1008 to 1010 is restricted. As described above, the paper cutting unit 249 is a device that cuts paper printed by the printing unit 248 at a position where the cut line 601 is to be printed. Therefore, in the case that the operation of the paper cutting unit 249 is enabled, the printing of the cut line 601 becomes unnecessary, and as such the operations on the setting items 1008 to 1010 may be disabled. It should be noted that the method of disabling the operations on the setting items 1008 to 1010 is not particularly limited, and examples thereof include a method of displaying the setting items 1008 to 1010 in a grayed-out manner and a method of hiding the setting items 1008 to 1010. In addition, a trigger for disabling the operation with respect to the setting items 1008 to 1010 is not limited to a case in which the operation of the paper cutting unit 249 is enabled, and for example, a case in which the page aggregation is "1 in 1" and the total page of printing is "one page", and the like can be cited.

The printing setting extension application 312 converts the device capability information into a setting value and displays the printing setting screen 100. Further, since the printing setting screen 100 is generated from the device capability information including the capability information unique to the printer vendor, it is possible to set setting items and setting values that cannot be set on the standard printing setting screen 900A or the detailed printing screen 900B provided by the OS 313. Further, the user can select an object 1002 on the printing setting screen 100. The object 1002 is an object for confirming printing settings. The printing setting extension application 312 provides a function for a user to freely and selectively change the printing setting, and in the case that the function is changed, the setting value is saved. For example, it is assumed that a user changes the paper size from "A4" to "Letter". In this case, the printing setting information stored in the printing setting extension application 312 is also changed from "A4" to "Letter". When the object 1002 is selected, the printing setting extension application 312 transfers the printing setting information processed in the printing setting screen 100 to the OS 313.

As shown in FIG. 8, in a step S812, in the case that printing setting extension application 312 transfers the printing setting information to the OS 313, the printing setting extension application 312 ends the display of the printing setting screen 100. Then, after the processing in step S812, the printing setting initial screen 1100 shown in FIG. 11 is displayed. The printing setting initial screen 1100 at this time is a screen including a setting value set by the printing setting extension application 312.

When the user selects the object 1105 on the printing setting initial screen 1100, a printing instruction is input to the OS 313. In step S813, the OS 313 executes processing related to printing based on the instruction input via the document generation application 315.

In step S814, upon receiving the input of the printing instruction in step S813, the OS 313 generates intermediate data and transfers the intermediate data and the printing setting information edited on the printing setting screen to the printing setting extension application 312. The "intermediate data" is data generated before conversion into printing data such as page description language (PDL), and is, for example, XPS data or the like. The printing setting information is also included in the intermediate data.

In a step S815, the printing setting extension application 312 receives the intermediate data and the printing setting information in the step S814, generates the printing data based on the intermediate data, and generates the printing capability information based on the printing setting information. The "printing data" is, for example, a PDL such as a PDF file. The "printing capability information" is, for example, information in which the printing setting information is described with an attribute value defined by the IPP.

In a step S816, the printing setting extension application 312 transfers the printing data and the printing capability information generated in the step S815 to the print queue of the OS 313. It should be noted that the steps S814 to S816 are processing in the case that the printing setting extension application 312 associated with the print queue is installed in the client terminal 101. In the case that the printing setting extension application 312 is not installed in the client terminal 101, the client terminal 101 executes processing to be described below in the step S816.

In a step S817, the OS 313 generates XPS data, edits a page layout, and converts the XPS data into a predetermined format to generate the printing data and the printing capability information. The "predetermined format" is, for example, PDF or PWG-Raster.

In a step S818, the OS 313 transmits the printing data and the printing capability information transferred from the printing setting extension application 312 or the printing data and the printing capability information generated by the OS 313 to the cloud print service 321 via the print queue.

In a step S819, the cloud print service 321 transmits the printing data and the printing capability information transferred from the client terminal 101 in step S818 to the cloud print compatible printer 104. It should be noted that, in the present embodiment, in the case that the cloud print service 321 receives the printing data and the printing capability information, the received printing data and printing capability information are transmitted to the cloud print compatible printer 104, but the present invention is not limited thereto. For example, the cloud print compatible printer 104 may be configured to periodically make an inquiry to the cloud print service 321 to acquire unprinted printing data and printing capability information corresponding to the printing data.

Through the above processing, the printing settings performed using the printing setting extension application 312 are reflected in the printing data. The printing data is transmitted to the cloud print compatible printer 104 via the cloud print service 321.

Figure 12:
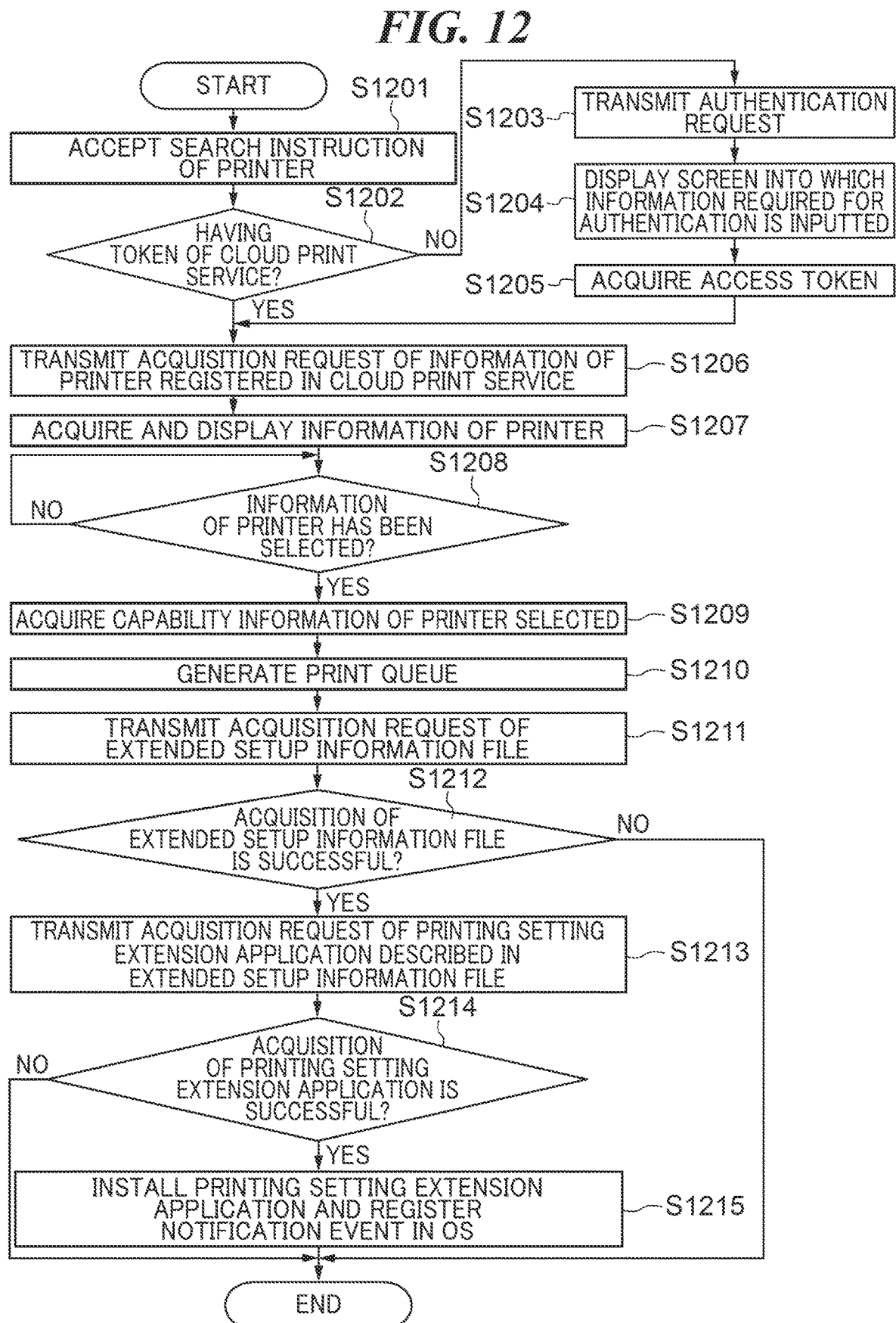
FIG. 12 is a flowchart that shows a processing in an operating system (OS) performed until the printing setting extension application is installed in the client terminal.

FIG. 12 is a flowchart showing processing in the OS performed until the printing setting extension application is installed in the client terminal. A program based on the flowchart shown in FIG. 12 is stored in the storage unit 214 of the client terminal 101. This program is executed by the CPU 212 of the client terminal 101. As shown in FIG. 12, in a step S1201, the CPU 212 displays the screen 400 shown in FIG. 4 on the display unit 216, and receives a printer search instruction from a user. The CPU 212 receives the printer search instruction in the case that the object 401 on the screen 400 is selected.

In a step S1202, the CPU 212 judges whether or not an access token of the cloud print service 321 is stored (held). The client terminal 101 stores the access token for acquiring information from the cloud print service 321 for each user who logs in to the client terminal 101. Then, the CPU 212 is able to judge whether or not the access token associated with the user logging in to the client terminal 101 is stored. As a result of the judgement in the step S1202, in the case that it is judged that the access token is stored, the processing proceeds to a step S1206. On the other hand, as a result of the judgement in the step S1202, in the case that it is judged that the access token is not stored, the processing proceeds to a step S1203.

In the step S1203, the CPU 212 transmits an authentication request to the cloud print service 321. Then, the CPU 212 receives, from the cloud print service 321, a URL for displaying a screen to which information necessary for the authentication (hereinafter referred to as "authentication information") is input.

In a step S1204, the CPU 212 accesses the URL received in the step S1203 and displays the screen to which the authentication information is input. Examples of the authentication information include a user ID (a user identifier) and a password.

In a step S1205, the CPU 212 transmits the authentication information to the cloud print service 321 to acquire the access token, and the processing proceeds to the step S1206. It should be noted that, in the case that the authentication of the cloud print service 321 fails, the CPU 212 cannot acquire the access token, and the processing ends.

In the step S1206, based on the access token, the CPU 212 transmits, to the cloud print service 321, a request for acquiring information on the printer to be registered in the cloud print service 321. The cloud print service 321 selects information on the printer available to the user identified by the access token received above, and transmits the selected information to the client terminal 101. In the present embodiment, as the information on the printer, a printer name registered in association with the printer and an HWID of the printer are used.

In a step S1207, the CPU 212 displays the information on the printer acquired from the cloud print service 321 in the step S1206 on the display unit 216 of the client terminal 101. With this display, the information on the printer is displayed in a list format in the area 402 of the screen 400.

In a step S1208, the CPU 212 judges whether or not the information on the printer displayed in the step S1207 has been selected. As a result of the judgement in the step S1208, in the case that it is judged that the information on the printer has been selected, the processing proceeds to a step S1209. On the other hand, as a result of the judgement in the step S1208, in the case that it is judged that the information on the printer has not been selected, the processing remains on standby in the step S1208, that is, the step S1208 is repeatedly executed.

In the step S1209, the CPU 212 transmits an acquisition request for the capability information of the printer selected in the step S1208 to the cloud print service 321. Here, it is assumed that the cloud print service 321 is inquired about setting items registered in advance in the OS 313.

In a step S1210, the CPU 212 updates the printer capability information stored in the client terminal 101 based on the information acquired from the cloud print service 321 in the step S1209, and generates a print queue.

In a step S1211, the CPU 212 transmits an acquisition request for the extended setup information file 700 to the online support service 351. The acquisition request includes the printer HWID.

In a step S1212, the CPU 212 judges whether or not the extended setup information file 700 has been successfully acquired in the step S1211. As a result of the judgement in the step S1212, in the case that it is judged that the acquisition has been successfully achieved, the processing proceeds to a step S1213. On the other hand, as a result of the judgement in the step S1212, in the case that it is judged that the acquisition has not been successfully achieved, that is, the acquisition has failed, the processing ends.

In the step S1213, the CPU 212 transmits an acquisition request for the printing setting extension application 312 included in the extended setup information file 700 acquired in the step S1212 to the application management service 331. Specifically, the CPU 212 acquires an application identifier of the printing setting extension application 312 from the extended setup information file 700. Then, the CPU 212 designates the application identifier and transmits the acquisition request for the printing setting extension application 312 to the application management service 331.

In a step S1214, the CPU 212 judges whether or not the printing setting extension application 312 has been successfully acquired. As a result of the judgement in the step S1214, in the case that it is judged that the acquisition has been successfully achieved, the processing proceeds to a step S1215. On the other hand, as a result of the judgement in the step S1214, in the case that it is judged that the acquisition has not been successfully achieved, the processing ends.

In the step S1215, the CPU 212 installs the printing setting extension application 312 acquired in the step S1214, and registers the application identifier of the printing setting extension application 312 in association with the print queue. As a result, the printing setting extension application 312 can be used in the client terminal 101. In the step S1215, an event indicating a notification timing is registered in the OS 313. Here, in the case that the print queue associated with the printing setting extension application 312 is selected on the printing setting initial screen 1100 displayed by the document generation application 315, the registration is performed.

Figure 13:
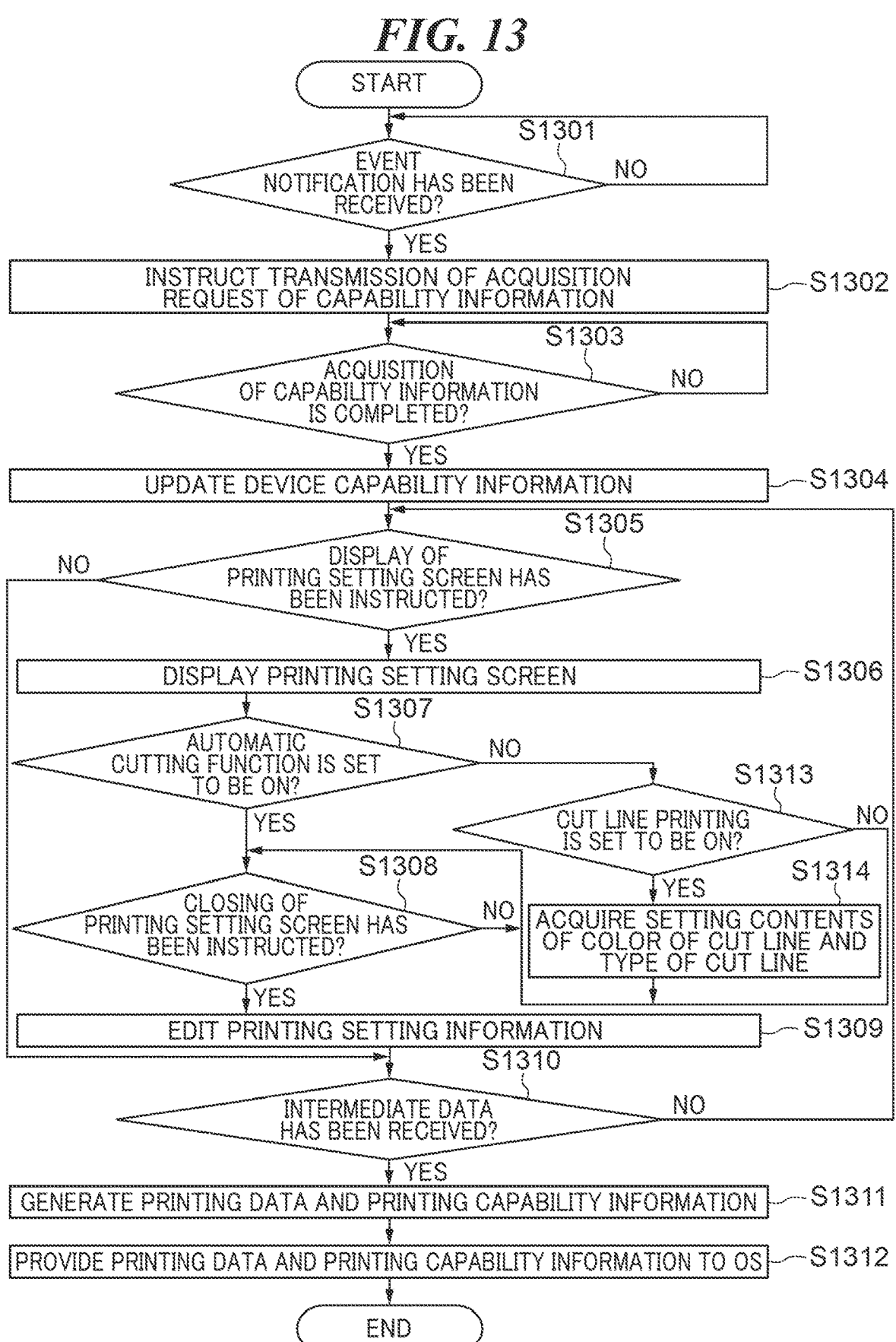
FIG. 13 is a flowchart that shows a processing performed until a second display (a printing setting) is performed by the printing setting extension application installed in the client terminal and then printing data is generated.

Next, a description will be given as to processing performed until the second display (the printing setting) is performed by the printing setting extension application 312 installed in the client terminal 101 and then printing data is generated with reference to FIG. 13. FIG. 13 is a flowchart showing processing performed until the second display (the printing setting) is performed by the printing setting extension application installed in the client terminal and then the printing data is generated. A program based on the flowchart shown in FIG. 13 is stored in the printing setting extension application 312. This program is loaded in the memory 213 of the client terminal 101 and executed by the CPU 212. As shown in FIG. 13, in step S1301, the CPU 212 judges whether or not an event notification in a step S1515 has been received. The "event" is an event issued by the OS 313, and is an event for notifying the printing setting extension application 312 that it is the timing registered in the step S1215 of the flowchart shown in FIG. 12. As a result of the judgement in the step S1301, in the case that it is judged that the event notification has been received, the processing proceeds to the step S1302. On the other hand, as a result of the judgement in the step S1301, in the case that it is judged that the event notification has not been received, the processing remains on standby in the step S1301, that is, the step S1301 is repeatedly executed.

In the step S1302, the CPU 212 transmits an acquisition request for the capability information (the first information and the second information) to the cloud print service 321. Specifically, the CPU 212 transmits the acquisition request for the capability information about the setting item set in the printing setting extension application 312 to the cloud print service 321. Here, the setting item (the second information) not acquired in step S1206 of FIG. 12 is also acquired.

In a step S1303, the CPU 212 judges whether or not the acquisition of the capability information in the step S1302 has been completed. As a result of the judgement in the step S1303, in the case that it is judged that the acquisition has been completed, the processing proceeds to a step S1304. On the other hand, as a result of the judgement in the step S1303, in the case that it is judged that the acquisition has not been completed, the processing remains on standby in the step S1303.

In the step S1304, the CPU 212 updates the device capability information with the capability information acquired in the step S1303. With this update, even for the setting item that the OS 313 does not acquire, the capability information is stored in the client terminal 101.

In a step S1305, the CPU 212 judges whether or not an instruction to display the printing setting screen 100 by the printing setting extension application 312 has been received. The "instruction to display printing setting screen 100 by the printing setting extension application 312" is an instruction based on an operation of selecting the object 1104 on the printing setting initial screen 1100 shown in FIG. 11 in the present embodiment, but is not limited thereto. As a result of the judgement in the step S1305, in the case that it is judged that the instruction to display the printing setting screen 100 has been received, the processing proceeds to a step S1306. On the other hand, as a result of the judgement in the step S1305, in the case that it is judged that the instruction to display the printing setting screen 100 has not been received, the processing proceeds to a step S1310.

In the step S1306, the CPU 212 displays the printing setting screen 100 shown in FIGS. 10A, 10B, 10C, 10D, 10E, and 10F based on the printer device information updated in the step S1304. As a result, the CPU 212 can receive a user operation via the printing setting screen 100.

In the step S1306, the CPU 212 judges whether or not the setting item 1007 (the automatic cutting function) on the printing setting screen 100 shown in FIG. 10F is set to be ON. As a result of the judgement in the step S1307, in the case that it is judged that the setting item 1007 is set to be ON, the processing proceeds to a step S1308. On the other hand, as a result of the judgement in the step S1307, in the case that it is judged that the setting item 1007 is not set to be ON, that is, the setting item 1007 is set to be OFF, the processing proceeds to a step S1313.

In the step S1313, the CPU 212 judges whether or not the setting item 1008 (the cut line printing) on the printing setting screen 100 shown in FIG. 10F is set to be ON. As a result of the judgement in the step S1313, in the case that it is judged that the setting item 1008 is set to be ON, the processing proceeds to a step S1314. On the other hand, as a result of the judgement in the step S1313, in the case that it is judged that the setting item 1008 is not set to be ON, that is, the setting item 1008 is set to be OFF, the processing proceeds to the step S1308.

In the step S1314, the CPU 212 acquires the setting content in the setting item 1009 (the color of the cut line) and the setting content in the setting item 1010 (the type of the cut line) on the printing setting screen 100 shown in FIG. 10F.

In the step S1308, the CPU 212 judges whether or not an instruction to end (close) the display of the printing setting screen 100 has been given. As a result of the judgement in the step S1308, in the case that it is judged that there is the instruction to end the display, the processing proceeds to the step S1309. On the other hand, as a result of the judgement in the step S1308, in the case that it is judged that there is no instruction to end the display, the processing remains on standby in the step S1308.

In the step S1309, the CPU 212 edits the printing setting information (the print ticket) with the setting value selected on the printing setting screen 100. Then, the CPU 212 ends the display of the printing setting screen 100.

In a step S1310, the CPU 212 judges whether or not the printing setting extension application 312 has received the intermediate data from the OS 313. As a result of the judgement in the step S1310, in the case that it is judged that the intermediate data has been received, the processing proceeds to a step S1311. On the other hand, as a result of the judgement in the step S1310, in the case that it is judged that the intermediate data has not been received, the processing returns to the step S1305, and the subsequent steps are sequentially executed.

In the step S1311, the CPU 212 generates the printing data and the printing capability information (the capability information) based on the intermediate data received in the step S1310. The CPU 212 also generates image data in a predetermined format based on the intermediate data and the printing setting information. Further, the CPU 212 generates the printing capability information described by the attribute value 502 defined by the IPP based on the printing setting information. The printing capability information can appropriately include other information in addition to the attribute value 502 defined by the IPP. As a result, the item name 501 and the attribute value 502 uniquely defined by the printer vendor can also be included in the printing capability information.

In a step S1312, the CPU 212 provides the OS 313 with the printing data and the printing capability information generated in the step S1311. The OS 313 transmits the data received via the print queue to the cloud print service 321. Thus, the cloud print compatible printer 104 can perform printing based on the printing data in the step S1311.

As described above, the capability information includes the first information related to the printing item that can be set by the general-purpose printer driver and the second information related to the cut line 601 which is a printing item that cannot be set by the general-purpose printer driver and is printed on a recording medium. Then, the printing setting extension application 312 can display the screen of the second information, that is, display the printing setting screen 100 shown in FIG. 10F as the second display. The second information can be used at the time of printing by appropriately operating the setting items 1008 to 1010 on the printing setting screen 100. Further, regardless of the presence or absence of the second display (display/non-display), the screen display of the first information (the first display), that is, the printing setting initial screen 1100 (see FIG. 11) is displayed. Then, the display is switched to the printing setting screen 100 by operating the object 1104 on the printing setting initial screen 1100. As a result, the printing setting initial screen 1100 and the printing setting screen 100 are prevented from being collectively displayed on one screen, and the printing setting initial screen 1100 and the printing setting screen 100 can be displayed on separate screens. As a result, each of the printing setting initial screen 1100 and the printing setting screen 100 has a size that is easy to be visually recognized.

Figure 14:
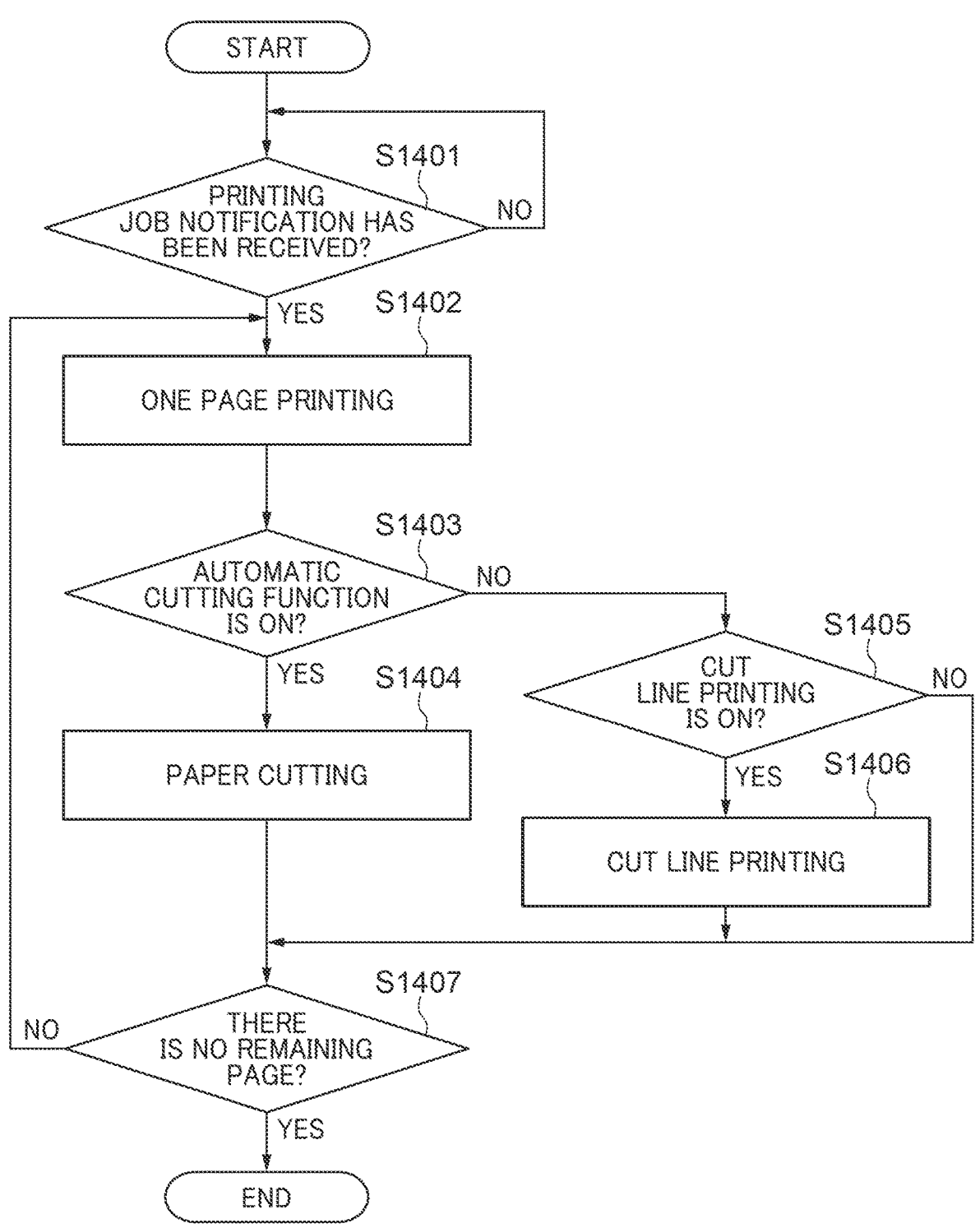
FIG. 14 is a flowchart that shows a processing in which cut line printing is performed by the cloud print compatible printer.

Next, a description will be given as to processing of performing the cut line printing using the cloud print compatible printer with reference to FIG. 14. FIG. 14 is a flowchart showing processing in which the cut line printing is performed by the cloud print compatible printer. As shown in FIG. 14, in a step S1401, the CPU 242 of the cloud print compatible printer 104 judges whether or not a printing job notification has been received from the client terminal 101 (the step S1401). As a result of the judgement in the step S1401, in the case that it is judged that the printing job notification has been received, the processing proceeds to a step S1402. On the other hand, as a result of the judgement in the step S1401, in the case that it is judged that the printing job notification has not been received, the processing remains on standby in the step S1401.

In the step S1402, the CPU 242 operates the printing unit 248 to print one page on paper.

In a step S1403, the CPU 242 judges whether or not the automatic cutting function included in the printing job notification is in the ON state. As a result of the judgement in the step S1403, in the case that it is judged that the automatic cutting function is in the ON state, the processing proceeds to a step S1404. On the other hand, as a result of the judgement in the step S1403, in the case that it is judged that the automatic cutting function is not in the ON state, that is, in the OFF state, the processing proceeds to a step S1405.

In the step S1404, the CPU 242 operates the paper cutting unit 249 to perform cut processing.

In the step S1405, the CPU 242 judges whether or not the cut line printing included in the printing job notification is in the ON state. As a result of the judgement in the step S1405, in the case that it is judged that the cut line printing is in the ON state, the processing proceeds to a step S1406. On the other hand, as a result of the judgement in the step S1405, in the case that it is judged that the cut line printing is not in the ON state, the processing proceeds to a step S1407.

In the step S1406, the CPU 242 operates the printing unit 248 to print the cut line 601 on the paper. It should be noted that the color of the cut line 601 to be printed is based on the setting content in the setting item 1009 (the color of the cut line) on the printing setting screen 100, and the type of the cut line 601 is based on the setting content in the setting item 1010 (the type of the cut line).

In the step S1407, the CPU 242 judges whether or not there is a remaining page to be printed. As a result of the judgement in the step S1407, in the case that it is judged that there is a remaining page, the processing returns to the step S1402, and the subsequent steps are sequentially executed. On the other hand, as a result of the judgement in the step S1407, in the case that it is judged that there is no remaining page, the processing ends.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-162457, filed on Oct. 7, 2022, which is hereby incorporated by reference herein in its entirety.

What is claimed is:

1. A non-transitory computer-readable storage medium storing a program for causing a computer to execute a control method for an information processing apparatus including a printer driver and a printing setting application, the control method comprising:

acquiring capability information on capability to perform printing on a sheet-like recording medium from a server providing a cloud print service or from a printer, the acquired capability information including (i) first information on printing items capable of being set by the printer driver, and (ii) second information on printing of a cut line indicating where the sheet-like recording medium is to be cut after printing, the printing of the cut line being a printing item that is capable of being set by the printing setting application, that is not capable of being set by the printer driver, and that causes the cut line to be printed on the sheet-like recording medium;

receiving an instruction to cause the printer to perform printing on the sheet-like recording medium;

generating, by the printing setting application, first printing data based, at least in part, on the printing of the cut line indicating where the sheet-like recording medium is to be cut after printing, the printing of the cut line being the printing item that is capable of being set by the printing setting application, that is not capable of being set by the printer driver, and that causes the cut line to be printed on the sheet-like recording medium;

generating, by the printer driver, second printing data based on both (iii) the printing items set by the printer driver and (iv) the first printing data generated based, at least in part, on the printing of the cut line, which is the printing item that is capable of being set by the printing setting application and is not capable of being set by the printer driver; and transmitting the generated second printing data to thereby cause the printer to perform the printing on the sheet-like recording medium based on the generated second printing data.

2. The storage medium according to claim 1, wherein the control method further comprises displaying a screen that includes the first information regardless of whether or not the second information is displayed on the screen.

3. The storage medium according to claim 1, wherein the control method further comprises displaying a screen that includes a print selection section configured to receive a selection for printing the cut line of the second information.

4. The storage medium according to claim 3, wherein, in a case that the print selection section receives the selection for printing the cut line, a color selection section configured to receive a selection of a color of the cut line is further displayed on the screen.

5. The storage medium according to claim 4, wherein the print selection section and the color selection section are collectively displayed on the screen.

6. The storage medium according to claim 4, wherein the print selection section and the color selection section are displayed on the screen by a scroll operation.

7. The storage medium according to claim 3, wherein, in a case that the print selection section receives the selection for printing the cut line, a line type selection section configured to receive a selection of a type of the cut line is further displayed on the screen.

8. The storage medium according to claim 7, wherein the print selection section and the line type selection section are collectively displayed on the screen.

9. The storage medium according to claim 7, wherein the print selection section and the line type selection section are displayed on the screen by a scroll operation.

10. The storage medium according to claim 1, wherein the printer includes a cutting unit configured to cut the recording medium at a position where the cut line should be printed, and wherein the control method further comprises displaying an instruction section configured to receive a selection for instructing an operation of the cutting unit, and in a case that the selection for instructing the operation of the cutting unit is received by the instruction section, an operation causing display of the second information is disabled.

11. The storage medium according to claim 1, wherein the control method further comprises:

performing an operation of switching from a screen display of the first information to a screen display of the second information.

12. The storage medium according to claim 1, wherein a roll paper sheet is used as the recording medium.

13. The storage medium according to claim 1, wherein the control method further comprises displaying a screen that includes a first control item configured to receive a selection that causes the cut line to be printed, and wherein the sheet-like recording medium is a roll paper sheet, and in a case where the selection that causes the cut line to be printed is received through the first control item, the cut line is caused to be printed on the roll paper sheet between pages of the roll paper sheet.

14. The storage medium according to claim 13, wherein the printer includes a cutting unit configured to cut the roll paper sheet between the pages of the roll paper sheet, and wherein the control method further comprises displaying, on the screen, a second control item configured to receive a selection that causes an operation of the cutting unit together with the first control item, and in a case that the selection that causes the operation of the cutting unit is received through the second control item, the first control item is disabled from receiving the selection that causes the cut line to be printed.

15. The storage medium according to claim 1, wherein the control method further comprises displaying a screen showing printing items that are capable of being set by the printer driver, wherein the printing of the cut line is not instructable through the displayed screen.

16. The storage medium according to claim 1, wherein the control method further comprises:

acquiring, by the printer driver, first device capability information corresponding to printing items capable of being set by the printer driver; and adding, to the acquired first device capability information and based on the acquired second information on printing the cut line, second capability information corresponding to the printing of the cut line indicating where the sheet-like recording medium is to be cut after printing.

17. The storage medium according to claim 1, wherein the control method further comprises displaying a screen including a first control item corresponding to the second information on printing the cut line indicating where the recording medium is to be cut after printing, wherein printing of the cut line is instructable through the first control item.

18. An information processing apparatus, comprising:

one or more memories;

computer-executable instructions stored in the one or more memories, the computer-executable instructions including:

a printer driver; and a printing setting application; and a processor configured to cooperatively execute the computer-executable instructions including the printing setting application and the printer driver to cause the information processing apparatus to:

acquire capability information on capability to perform printing on a sheet-like recording medium from a server providing a cloud print service or from a printer, the acquired capability information including (i) first information on printing items capable of being set by the printer driver, and (ii) second information on printing of a cut line indicating where the sheet-like recording medium is to be cut after printing, the printing of the cut line being a printing item that is capable of being set by the printing setting application, that is not capable of being set by the printer driver, and that causes the cut line to be printed on the sheet-like recording medium;

receive an instruction to cause the printer to perform printing on the sheet-like recording medium;

generate, using the printing setting application, first printing data based, at least in part, on the printing of the cut line indicating where the sheet-like recording medium is to be cut after printing, the printing of the cut line being the printing item that is capable of being set by the printing setting application, that is not capable of being set by the printer driver, and that causes the cut line to be printed on the sheet-like recording medium;

generate, using the printer driver, second printing data based on both (iii) the printing items set by the printer driver and (iv) the first printing data generated based, at least in part, on the printing of the cut line, which is the printing item that is capable of being set by the printing setting application and is not capable of being set by the printer driver; and transmit the generated second printing data to thereby cause the printer to perform the printing on the sheet-like recording medium based on the generated second printing data.

19. A control method for an information processing apparatus including a printer driver and a printing setting application, the control method comprising:

acquiring capability information on capability to perform printing on a sheet-like recording medium from a server providing a cloud print service or from a printer, the acquired capability information including (i) first information on printing items capable of being set by the printer driver, and (ii) second information on printing of a cut line indicating where the sheet-like recording medium is to be cut after printing, the printing of the cut line being a printing item that is capable of being set by the printing setting application, that is not capable of being set by the printer driver, and that causes the cut line to be printed on the sheet-like recording medium;

receiving an instruction to cause the printer to perform printing on the sheet-like recording medium;

generating, by the printing setting application, first printing data based, at least in part, on the printing of the cut line indicating where the sheet-like recording medium is to be cut after printing, the printing of the cut line being the printing item that is capable of being set by the printing setting application, that is not capable of being set by the printer driver, and that causes the cut line to be printed on the sheet-like recording medium;

generating, by the printer driver, second printing data based on both (iii) the printing items set by the printer driver and (iv) the first printing data generated based, at least in part, on the printing of the cut line, which is the printing item that is capable of being set by the printing setting application and is not capable of being set by the printer driver; and transmitting the generated second printing data to thereby cause the printer to perform the printing on the sheet-like recording medium based on the generated second printing data.

\* \* \* \* \*